United States Patent
Kawahara et al.

(10) Patent No.: US 12,077,625 B2
(45) Date of Patent: Sep. 3, 2024

(54) PELLETS INCLUDING BLOCK COPOLYMER AND SHAPED ARTICLES OBTAINED FROM SUCH PELLETS

(71) Applicant: KURARAY CO., LTD., Kurashiki (JP)

(72) Inventors: Moe Kawahara, Tsukuba (JP); Makoto Akai, Tsukuba (JP); Kanayo Nakada, Chiyoda-ku (JP); Tomohiro Ono, Tsukuba (JP)

(73) Assignee: KURARAY CO., LTD., Kurashiki (JP)

( * ) Notice: Subject to any disclaimer, the term of this patent is extended or adjusted under 35 U.S.C. 154(b) by 649 days.

(21) Appl. No.: 17/283,191

(22) PCT Filed: Oct. 4, 2019

(86) PCT No.: PCT/JP2019/039382
§ 371 (c)(1),
(2) Date: Apr. 6, 2021

(87) PCT Pub. No.: WO2020/075655
PCT Pub. Date: Apr. 16, 2020

(65) Prior Publication Data
US 2021/0347931 A1 Nov. 11, 2021

(30) Foreign Application Priority Data
Oct. 10, 2018 (JP) .................. 2018-191683

(51) Int. Cl.
*C08F 299/04* (2006.01)
*C08J 3/12* (2006.01)
*C08L 33/12* (2006.01)
*C08L 53/00* (2006.01)

(52) U.S. Cl.
CPC ........... *C08F 299/0492* (2013.01); *C08J 3/12* (2013.01); *C08J 2353/00* (2013.01); *C08L 33/12* (2013.01); *C08L 53/00* (2013.01)

(58) Field of Classification Search
CPC .......... C08L 53/00; C08L 33/12; C08L 33/04; C08L 33/10
See application file for complete search history.

(56) References Cited

U.S. PATENT DOCUMENTS

| | | | |
|---|---|---|---|
| 5,264,527 A | 11/1993 | Varshney et al. | |
| 5,294,674 A | 3/1994 | Varshney et al. | |
| 5,591,816 A | 1/1997 | Varshney et al. | |
| 5,668,231 A | 9/1997 | Varshney et al. | |
| 2018/0112023 A1* | 4/2018 | Sugawara | G02B 1/04 |

FOREIGN PATENT DOCUMENTS

| | | |
|---|---|---|
| EP | 2 130 869 A1 | 12/2009 |
| JP | 6-93060 A | 4/1994 |
| JP | 7-25859 B2 | 3/1995 |
| JP | 11-335432 A | 12/1999 |
| JP | 2003-253005 A | 9/2003 |
| JP | 2012-207155 A | 10/2012 |
| JP | 2012-213912 A | 11/2012 |
| JP | 2013-39287 A | 2/2013 |
| JP | 2015-116693 A | 6/2015 |
| JP | 2017-145315 A | 8/2017 |
| JP | 2017-179231 A | 10/2017 |
| KR | 10-2018-0011155 A | 1/2018 |
| TW | 201700514 A | 1/2017 |
| WO | WO 2007/060930 A1 | 5/2007 |
| WO | WO 2013/183567 A1 | 12/2013 |
| WO | WO 2016/175119 A1 | 11/2016 |
| WO | WO 2016/190138 A1 | 12/2016 |
| WO | WO 2017/179415 A1 | 10/2017 |
| WO | WO 2017/179479 A1 | 10/2017 |

OTHER PUBLICATIONS

WO2017/179415 machine translation (Year: 2023).*
JP2003-253005 machine translation (Year: 2023).*
Extended European Search Report issued Aug. 1, 2022, in corresponding European Patent Application No. 19871505.4, 6 pages.
International Search Report and Written Opinion issued Dec. 10, 2019 in PCT/JP2019/039382 filed Oct. 4, 2019, 11 pages.
Georges Moineau, et al., "Synthesis of fully acrylic thermoplastic elastomers by atom transfer radical polymerization (ATRP), 2ª, Effect of the catalyst on the molecular control and the rheological properties of the triblock copolymers," Macromol. Chem. Phys., vol. 201, 2000, pp. 1108-1114.

* cited by examiner

*Primary Examiner* — Marc S Zimmer
*Assistant Examiner* — Jeffrey S Lenihan
(74) *Attorney, Agent, or Firm* — Oblon, McClelland, Maier & Neustadt, L.L.P.

(57) ABSTRACT

Pellets of an acrylic block copolymer (I) having a polymer block (A1) containing methacrylic acid ester units and a polymer block (B1) containing acrylic acid ester units, and an acrylic polymer (II) having 35 mass % or more methyl methacrylate units are provided. The polymer block (B1) is made of methyl acrylate units and acrylic acid ester units of formula $CH_2=CH-COOR^1$ (1), wherein $R^1$ represents a C4-C12 alkyl group. A shaped article prepared with the pellets is also provided.

4 Claims, No Drawings

PELLETS INCLUDING BLOCK COPOLYMER AND SHAPED ARTICLES OBTAINED FROM SUCH PELLETS

TECHNICAL FIELD

The present invention relates to pellets that include an acrylic block copolymer having a polymer block containing methyl acrylate units, and to shaped articles obtained by shaping the pellets.

BACKGROUND ART

Acrylic block copolymers that include a polymer block including acrylic acid ester units and a polymer block including methacrylic acid ester units have characteristics which make them attractive for use in various applications such as adhesives, soft materials and resin modifiers. Among such acrylic block copolymers, those acrylic block copolymers that include methyl acrylate units in the polymer block containing acrylic acid ester units have excellent properties such as resistance to plasticizers and adhesion, and are increasingly studied for use in laminates with, for example, vinyl chloride resins or the like (for example, Patent Literature 1).

Acrylic block copolymers are formed into shaped articles by various shaping methods such as injection molding and extrusion. In such cases, the acrylic block copolymers as feedstocks are usually produced in the form of granular pellets. Unfortunately, acrylic block copolymers that include methyl acrylate units in a polymer block containing acrylic acid ester units have a significantly high blocking tendency. Pellets prepared from such an acrylic block copolymer, when allowed to stand as such for a while, stick to one another due to the own weight of the pellets to form large block-shaped masses. Such masses are often hardly disassembled back into pellets by simple application of external force. When a feedstock that has stuck together into large block-shaped masses is to be processed into a shaped article, the masses need to be broken again into pellets in some way. This fact is a significant challenge in the productivity and quality control of shaped articles.

A possible approach to preventing the blocking of pellets is to attach an antiblocking agent such as ethylenebisstearamide to the surface of the pellets. However, the use of ethylenebisstearamide as an antiblocking agent results in problems such as a decrease in the transparency of shaped articles that are obtained, and the occurrence of die buildup.

Another antiblocking approach that has been studied is to add a lubricant to an acrylic block copolymer (for example, Patent Literature 2).

CITATION LIST

Patent Literature

Patent Literature 1: WO 2016/175119
Patent Literature 2: JP-A-2003-253005

SUMMARY OF INVENTION

Technical Problem

The antiblocking approach described in Patent Literature 2 is sometimes incapable of sufficiently preventing the blocking of pellets. Adding an extremely large amount of the antiblocking agent was attempted, but the resultant pellets gave shaped articles which tended to suffer deterioration in the outstanding characteristics (for example, transparency) of the acrylic block copolymer. Objects of the present invention are to provide sufficiently antiblock pellets that include an acrylic block copolymer which has a polymer block including methyl acrylate units, and to provide a shaped article from the pellets with high productivity while avoiding deterioration in the outstanding characteristics of the acrylic block copolymer.

Solution to Problem

The present inventors carried out extensive studies directed to achieving the above objects. As a result, the present inventors have found that the blocking of pellets is sufficiently prevented by producing pellets from a combination in a specific mass ratio of a specific acrylic block copolymer which has a polymer block including methyl acrylate units, and a dissimilar specific acrylic polymer. The present inventors have further found that a shaped article can be fabricated from the pellets without incurring deterioration in the outstanding characteristics of the acrylic block copolymer.

According to the present invention, the objects described above are achieved by providing:

[1] Pellets including an acrylic block copolymer (I) including at least one polymer block (A1) including methacrylic acid ester units, and at least one polymer block (B1) including acrylic acid ester units, and an acrylic polymer (II) containing 35 mass % or more methyl methacrylate units and having a melt flow rate (MFR) measured at 230° C. under 3.8 kg load of not less than 10 g/10 min, the acrylic acid ester units present in the polymer block (B1) of the acrylic block copolymer (I) consisting solely of methyl acrylate units and acrylic acid ester (1) units represented by the general formula $CH_2=CH-COOR^1$ (1) (wherein $R^1$ represents a C4-C12 organic group), the mass ratio (I)/(II) of the acrylic block copolymer (I) to the acrylic polymer (II) being 90/10 to 40/60;

[2] The pellets described in [1], further including 200 to 2000 ppm of an antiblocking agent; and

[3] A shaped article obtained by shaping the pellets described in [1] or [2].

Advantageous Effects of Invention

The pellets obtained according to the present invention that include an acrylic block copolymer which has a polymer block including methyl acrylate units are sufficiently prevented from sticking to one another. Shaped articles may be obtained from the pellets with high productivity while avoiding deterioration in the outstanding characteristics of the acrylic block copolymer.

DESCRIPTION OF EMBODIMENTS

The present invention will be described in detail hereinbelow. In the present specification, "(meth)acrylic acid ester" is a general term for "methacrylic acid ester" and "acrylic acid ester", and "(meth)acrylic" is a general term for "methacrylic" and "acrylic".

⟨Acrylic Block Copolymers (I)⟩

An acrylic block copolymer (I) included in pellets of the present invention includes at least one polymer block (A1) including methacrylic acid ester units, and at least one polymer block (B1) including acrylic acid ester units. The acrylic acid ester units present in the polymer block (B1) consist solely of methyl acrylate units and acrylic acid ester (1) units represented by the general formula $CH_2=CH-COOR^1$ (1) (wherein $R^1$ represents a C4-C12 organic group).

Examples of the methacrylic acid esters for forming the constituent units in the polymer block (A1) include alkyl methacrylates such as methyl methacrylate, ethyl methacrylate, propyl methacrylate, n-butyl methacrylate, t-butyl methacrylate, n-hexyl methacrylate, cyclohexyl methacrylate, 2-ethylhexyl methacrylate, n-octyl methacrylate, lauryl methacrylate, tridecyl methacrylate, stearyl methacrylate and isobornyl methacrylate;

methacrylic acid esters having no functional groups other than alkyl methacrylates such as phenyl methacrylate and benzyl methacrylate; and methacrylic acid esters having a functional group such as methacrylic acid alkoxyalkyl esters including methoxyethyl methacrylate and ethoxyethyl methacrylate, diethylaminoethyl methacrylate, 2-hydroxyethyl methacrylate, 2-aminoethyl methacrylate, glycidyl methacrylate and tetrahydrofurfuryl methacrylate.

Among these, alkyl methacrylates are preferable, and methyl methacrylate, ethyl methacrylate and propyl methacrylate are more preferable. For reasons such as economical availability and because the polymer block (A1) that is obtained has excellent durability and weather resistance, methyl methacrylate is still more preferable.

The methacrylic acid ester units in the polymer block (A1) may be derived from only one kind of a methacrylic acid ester, or may be derived from two or more kinds of methacrylic acid esters. The proportion of the methacrylic acid ester units present in the polymer block (A1) is preferably not less than 60 mass %, more preferably not less than 80 mass %, and still more preferably not less than 90 mass % of the polymer block (A1). The polymer block (A1) may be composed of 100 mass % of methacrylic acid ester units, that is, may consist solely of methacrylic acid ester units.

The polymer block (A1) may include other monomer units as long as the advantageous effects of the present invention are not impaired. Examples of such additional monomers include acrylic acid esters; vinyl monomers having a carboxyl group such as (meth)acrylic acid, crotonic acid, maleic acid, maleic anhydride and fumaric acid; vinyl monomers having a functional group such as (meth)acrylamide, (meth)acrylonitrile, vinyl acetate, vinyl chloride and vinylidene chloride; aromatic vinyl monomers such as styrene, α-methylstyrene, p-methylstyrene and m-methylstyrene: conjugated diene monomers such as butadiene and isoprene; olefin monomers such as ethylene, propylene, isobutene and octene; and lactone monomers such as s-caprolactone and valerolactone. The monomer units derived from these additional monomers are usually present in a small amount relative to all the monomer units in the polymer block (A1). The proportion of the additional monomer units present in the polymer block (A1) is preferably not more than 40 mass %, more preferably not more than 20 mass %, and still more preferably not more than 10 mass %.

The glass transition temperature (Tg) of the polymer block (A1) is preferably 50 to 150° C., more preferably 60 to 140° C., and still more preferably 70 to 130° C. When the glass transition temperature of the polymer block (A1) is within the above range, the blocking tendency at a high temperature (for example, 50° C.) tends to be reduced (the antiblocking properties tend to be enhanced) during storage of the pellets.

The acrylic block copolymer (I) may include two or more polymer blocks (A1). In such a case, the polymer blocks (A1) may be composed of the same or different methacrylic acid ester units and additional monomers.

The weight average molecular weight of the polymer block (A1) is not particularly limited, but is preferably in the range of 1,000 to 50,000, and more preferably in the range of 4,000 to 20,000. If the weight average molecular weight of the polymer block (A1) is less than 1,000, the acrylic block copolymer (I) that is obtained may show insufficient cohesive force. If the weight average molecular weight of the polymer block (A1) is higher than 50,000, the acrylic block copolymer (I) that is obtained exhibits so high a melt viscosity that, for example, the productivity of the acrylic block copolymer (I) and the shaping properties of the pellets including such an acrylic block copolymer (I) may be deteriorated. In the present specification, the weight average molecular weight (Mw) means the weight average molecular weight measured by the gel permeation chromatography (GPC) method relative to standard polystyrenes.

The polymer block (B1) includes acrylic acid ester units. The acrylic acid ester units present in the polymer block (B1) consist solely of methyl acrylate units and acrylic acid ester (1) units represented by the general formula $CH_2=CH-COOR^1$ (1) (wherein $R^1$ represents a C4-C12 organic group).

Examples of the acrylic acid esters (1) include acrylic acid esters having no functional groups, for example, alkyl acrylates having a C4-C12 alkyl group such as n-butyl acrylate, isobutyl acrylate, sec-butyl acrylate, tert-butyl acrylate, amyl acrylate, isoamyl acrylate, n-hexyl acrylate, 2-ethylhexyl acrylate, n-octyl acrylate, isooctyl acrylate, decyl acrylate, isobornyl acrylate, lauryl acrylate, cyclohexyl acrylate, phenyl acrylate and benzyl acrylate; and acrylic acid esters having a functional group such as 2-ethoxyethyl acrylate, 2-(diethylamino)ethyl acrylate, tetrahydrofurfuryl acrylate and 2-phenoxyethyl acrylate.

Among these acrylic acid esters (1), acrylic acid esters having no functional groups are preferable for the reason that the phase separation between the polymer block (A1) and the polymer block (B1) becomes clearer. Alkyl acrylates having a C4-C12 alkyl group are more preferable, and n-butyl acrylate and 2-ethylhexyl acrylate are still more preferable. Further, n-butyl acrylate is even more preferable because such pellets tend to give shaped articles that are flexible, high in adhesion and excellent in durability.

The acrylic acid ester (1) units present in the polymer block (B1) may be derived from only one kind of an acrylic acid ester (1), or may be derived from two or more kinds of acrylic acid esters (1).

The mass ratio of the methyl acrylate units to the acrylic acid ester (1) units in the polymer block (B1), that is, methyl acrylate/acrylic acid ester (1), is preferably 90/10 to 10/90. When the mass ratio is within the above range, the acrylic block copolymer (I) attains an excellent balance between the plasticizer resistance stemming from the methyl acrylate units and the flexibility ascribed to the acrylic acid ester (1) units. To attain a still enhanced balance between the plasticizer resistance and the flexibility, the mass ratio, methyl acrylate/acrylic acid ester (1), is preferably 90/10 to 25/75, more preferably 85/15 to 37/63, and still more preferably 80/20 to 42/58. The mass ratio of the methyl acrylate units to the acrylic acid ester (1) units may be determined by $^1$H-NMR measurement.

The upper limit of the proportion of the methyl acrylate units in the acrylic acid ester units in the polymer block (B1) is preferably 90%, more preferably 85%, and still more preferably 80%. The lower limit of the proportion of the methyl acrylate units in the polymer block (B1) is preferably 25%, more preferably 37%, and still more preferably 42%.

In the polymer block (B1), the proportion of the acrylic acid ester units consisting solely of the methyl acrylate units and the acrylic acid ester (1) units is preferably not less than 60 mass %, more preferably not less than 80 mass %, and still more preferably not less than 90 mass % of the polymer block (B1). The polymer block (B1) may be composed of 100 mass % of the acrylic acid ester units, that is, may consist solely of the acrylic acid ester units.

The polymer block (B1) may contain additional monomer units other than the acrylic acid ester units as long as the advantageous effects of the present invention are not impaired. Examples of the additional monomers for forming such units include methacrylic acid esters; vinyl monomers having a carboxyl group such as (meth)acrylic acid, crotonic acid, maleic acid, maleic anhydride and fumaric acid; vinyl monomers having a functional group such as (meth)acrylamide, (meth)acrylonitrile, vinyl acetate, vinyl chloride and vinylidene chloride; aromatic vinyl monomers such as styrene, α-methylstyrene, p-methylstyrene and m-methylstyrene: conjugated diene monomers such as butadiene and isoprene; olefin monomers such as ethylene, propylene, isobutene and octene; and lactone monomers such as s-caprolactone and valerolactone. The monomer units derived from these additional monomers are usually present in a small amount relative to all the monomer units in the polymer block (B1). The proportion of the additional monomer units present in the polymer block (B1) is preferably not more than 40 mass %, more preferably not more than 20 mass %, and still more preferably not more than 10 mass %.

Further, the acrylic block copolymer (I) may include two or more polymer blocks (B1). In such a case, the polymer blocks (B1) may be composed of the same or different combinations of acrylic acid ester units.

The polymer block (B1) may be a random copolymer of methyl acrylate and an acrylic acid ester (1) selected to constitute the polymer block (B1), or may be a block copolymer, a graft copolymer or a tapered block copolymer (a gradient copolymer). When the acrylic block copolymer (I) includes two or more polymer blocks (B1), the structures of the polymer blocks (B1) may be the same as or different from one another.

The glass transition temperature (Tg) of the polymer block (B1) is more preferably −45 to 55° C., more preferably −35 to 50° C., still more preferably −30 to 45° C., and further preferably −30 to 25° C. When the glass transition temperature is in this range, shaped articles obtained from such pellets tend to be flexible, high in adhesion and excellent in durability.

The difference in glass transition temperature between the polymer block (A1) and the polymer block (B1) in the acrylic block copolymer (I) is preferably 50° C. or more, and more preferably 70° C. or more.

The acrylic block copolymer (I) is preferably represented by any of the general formulae below where "A1" is the polymer block (A1) and "B1" is the polymer block (B1):

(A1-B1)$_n$ (A1-B1)$_n$-A1

A1-(A1-B1)$_n$ (A1-B1)$_n$—Z (B1-A1)$_n$—Z

In the formulae, n is an integer of 1 to 30, and Z is a coupling site (a coupling site resulting from the formation of a chemical bond by the reaction of the polymer end with a coupling agent). The value of n is preferably 1 to 15, more preferably 1 to 8, and still more preferably 1 to 4.

Of the structures described above, those in which the polymer block (A1) is bonded to each of both ends of the polymer block (B1) are preferable.

Specifically, those represented by the following general formulae are preferable:

(A1-B1)$_m$ (A1-B1)$_n$-A1

B1-(A1-B1)$_m$ (A1-B1)$_m$—Z (B1-A1)$_m$—Z

In the formulae, n is an integer of 1 to 30, m is an integer of 2 to 30, and Z is a coupling site (a coupling site resulting from the formation of a chemical bond by the reaction of the polymer end with a coupling agent). The value of m is preferably 2 to 15, more preferably 2 to 8, and still more preferably 2 to 4. The value of n is preferably 1 to 15, more preferably 1 to 8, and still more preferably 1 to 4.

Of the above structures, linear block copolymers represented by (A1-B1)$_n$, (A1-B1)$_n$-A1, and A1-(A1-B1)$_n$ are more preferable. The diblock copolymer represented by A1-B1, and the triblock copolymer represented by A1-B1-A1 are still more preferable, and the triblock copolymer represented by A1-B1-A1 is particularly preferable. These may be used singly, or two or more may be used in combination.

The content of the polymer block (A1) in the acrylic block copolymer (I) is preferably 5 to 40 mass %.

If the content of the polymer block (A1) is less than 5 mass %, the acrylic block copolymer (I) may be too much fluid and tends to be liquid, and when pellets are produced from the acrylic block copolymer (I) and an acrylic polymer (II) described later by, for example, cutting with an underwater cutter or the like, the pellets tend to be incapable of keeping the pellet shape. If the content of the polymer block (A1) exceeds 40 mass %, flexibility tends to be deteriorated.

To obtain pellets with excellent flexibility, the content of the polymer block (A1) in the acrylic block copolymer (I) is preferably 8 to 35 mass %, and more preferably 14 to 31 mass %.

From the points of view of the compatibility with the acrylic polymer (II) described later and the processability of the obtainable pellets, the weight average molecular weight of the acrylic block copolymer (I) is preferably 30,000 to 250,000, more preferably 40,000 to 200,000, still more preferably 50,000 to 180,000, and further preferably 60,000 to 160,000. If the weight average molecular weight of the acrylic block copolymer (I) is less than 30,000, the cohesive force of the acrylic block copolymer (I) may be insufficient, and shaped articles that are obtained may be inferior in properties such as durability. Other problems may arise such as the acrylic block copolymer (I) bleeding on the surface of shaped articles that are obtained. If, on the other hand, the weight average molecular weight of the acrylic block copolymer (I) exceeds 250,000, the melt viscosity is so increased that the productivity and processability may be deteriorated. Other problems may arise such as low compatibility with the acrylic polymer (II) described later, and consequent poor transparency of the pellets that are obtained and of shaped articles that are obtained from the pellets, and variations in properties of the pellets that are obtained and of shaped articles that are obtained from the pellets.

In the acrylic block copolymer (I), the molecular weight distribution (Mw/Mn) is preferably 1.0 to 1.5. When the molecular weight distribution of the acrylic block copolymer (I) is in the above range, the acrylic block copolymer (I) will exhibit an increased cohesive force and the pellets that are obtained tend to be unlikely to contaminate a mold during the molding process. From these points of view, the molecular weight distribution is more preferably 1.0 to 1.4, and still more preferably 1.0 to 1.3. In the present specification, the number average molecular weight (Mn) and the weight average molecular weight (Mw) mean the number average molecular weight and the weight average molecular weight measured by the gel permeation chromatography (GPC) method relative to standard polystyrenes.

⟨Acrylic Polymers (II)⟩

The acrylic polymer (II) included in the pellets of the present invention is a polymer differing from the acrylic block copolymer (I), and contains 35 mass % or more methyl methacrylate units and has a melt flow rate (MFR) measured at 230° C. under 3.8 kg load of not less than 10 g/10 min. By combining the acrylic block copolymer (I) with the acrylic polymer (II) that satisfies both conditions of the content of methyl methacrylate units and the MFR, it becomes possible to produce pellets that are sufficiently prevented from blocking. Further, the pellets thus obtained give shaped articles that do not suffer deterioration in the superior characteristics stemming from the acrylic block copolymer (I).

The content of methyl methacrylate units present in the acrylic polymer (II) is preferably 37 mass % or more. By using such an acrylic polymer (II), sufficiently antiblock pellets may be produced more reliably.

From the points of view of the compatibility with the acrylic block copolymer (I) and the processability of pellets that are obtained, the MFR of the acrylic polymer (II) measured at a temperature of 230° C. under a load of 3.8 kg is preferably 10 to 400 g/10 min. If the MFR is less than 10 g/10 min, the antiblocking performance tends to be lowered due to the melt viscosity being high. If the MFR exceeds 400 g/10 min, the kneadability during processing tends to be insufficient due to the low melt viscosity.

The acrylic polymers (II) are largely classified into acrylic block copolymers (II-1) that have a polymer block including methyl methacrylate units, and random copolymers including methyl methacrylate units, or methyl methacrylate homopolymers (II-2).

⟨Acrylic Block Copolymers (II-1)⟩

The acrylic block copolymer (II-1) that may be included in the pellets of the present invention is an acrylic block copolymer which has a polymer block including methyl methacrylate units and has a content of the methyl methacrylate units of not less than 35 mass % of the copolymer.

For the reasons that the compatibility with the acrylic block copolymer (I) is further enhanced and higher flexibility is obtained, preferred acrylic block copolymers (II-1) are acrylic block copolymers (II-1A) which include at least one polymer block (A2) including methyl methacrylate units and at least one polymer block (B2) including acrylic acid ester units and which are such that the acrylic acid ester units present in the polymer block (B2) consist solely of acrylic acid ester (2) units represented by the general formula $CH_2=CH-COOR^2$ (2) (wherein $R^2$ represents a C4-C12 organic group).

The proportion of the methyl methacrylate units present in the polymer block (A2) is preferably not less than 60 mass %, more preferably not less than 80 mass %, and still more preferably not less than 90 mass % of the polymer block (A2). Further, the polymer block (A2) may be composed of 100 mass % of methyl methacrylate units, that is, may consist solely of methyl methacrylate units.

The polymer block (A2) may include additional monomer units other than methyl methacrylate as long as the advantageous effects of the present invention are not impaired. Specific examples of such additional monomers include methacrylic acid esters except methyl methacrylate, acrylic acid esters; vinyl monomers having a carboxyl group such as (meth)acrylic acid, crotonic acid, maleic acid, maleic anhydride and fumaric acid; vinyl monomers having a functional group such as (meth)acrylamide, (meth)acrylonitrile, vinyl acetate, vinyl chloride and vinylidene chloride; aromatic vinyl monomers such as styrene, α-methylstyrene, p-methylstyrene and m-methylstyrene: conjugated diene monomers such as butadiene and isoprene; olefin monomers such as ethylene, propylene, isobutene and octene; and lactone monomers such as s-caprolactone and valerolactone. The monomer units derived from these additional monomers are usually present in a small amount relative to all the monomer units in the polymer block (A2). The proportion of the additional monomer units present in the polymer block (A2) is preferably not more than 40 mass %, more preferably not more than 20 mass %, and still more preferably not more than 10 mass %.

The glass transition temperature (Tg) of the polymer block (A2) is preferably 50 to 150° C., more preferably 70 to 140° C., and still more preferably 80 to 130° C. When the glass transition temperature of the polymer block (A2) is within the above range, the blocking tendency at a high temperature (for example, 50° C.) tends to be reduced (the antiblocking properties tend to be enhanced) during storage of the pellets.

The acrylic block copolymer (II-1A) may include two or more polymer blocks (A2). In such a case, the polymer blocks (A2) may be composed of the same or different methyl methacrylate units and additional monomers.

The weight average molecular weight of the polymer block (A2) is not particularly limited, but is preferably in the range of 1,000 to 50,000, and more preferably in the range of 4,000 to 20,000. If the weight average molecular weight of the polymer block (A2) is less than 1,000, the acrylic block copolymer (II-1A) that is obtained may show insufficient cohesive force. If the weight average molecular weight of the polymer block (A2) is higher than 50,000, the acrylic block copolymer (II-1A) that is obtained exhibits so high a melt viscosity that, for example, the productivity of the acrylic block copolymer (II-1A) and the shaping properties of the pellets including such an acrylic block copolymer (II-1A) may be deteriorated.

The polymer block (B2) includes acrylic acid ester units, and the acrylic acid ester units present in the polymer block (B2) consist solely of acrylic acid ester (2) units represented by the general formula $CH_2=CH-COOR^2$ (2) (wherein $R^2$ represents a C4-C12 organic group).

Specific examples of the acrylic acid esters (2) are the same as those of the acrylic acid esters (1) that are one of the constituent units forming the polymer block (B1) in the acrylic block copolymer (I).

Among those acrylic acid esters (2), acrylic acid esters having no functional groups are preferable for the reason that the phase separation between the polymer block (A2) and the polymer block (B2) becomes clearer. Alkyl acrylates having a C4-C12 alkyl group are more preferable, and n-butyl acrylate and 2-ethylhexyl acrylate are still more preferable. Further, n-butyl acrylate is even more preferable because such pellets tend to give shaped articles that are flexible, high in adhesion and excellent in durability.

The acrylic acid ester (2) units that are the acrylic acid ester units present in the polymer block (B2) may be derived from only one kind of an acrylic acid ester (2), or may be derived from two or more kinds of acrylic acid esters (2).

In the polymer block (B2), the proportion of the acrylic acid ester units is preferably not less than 60 mass %, more preferably not less than 80 mass %, and still more preferably not less than 90 mass % of the polymer block (B2). The polymer block (B2) may be composed of 100 mass % of the acrylic acid ester units, that is, may consist solely of the acrylic acid ester units.

The polymer block (B2) may contain additional monomer units other than the acrylic acid ester units as long as the advantageous effects of the present invention are not impaired. Specific examples of the additional monomers are the same as those of the additional monomers optionally used to form constituent units in the polymer block (B1) of the acrylic block copolymer (I). The monomer units derived from these additional monomers are usually present in a small amount relative to all the monomer units in the polymer block (B2). The proportion of the additional monomer units present in the polymer block (B2) is preferably not more than 40 mass %, more preferably not more than 20 mass %, and still more preferably not more than 10 mass %.

The glass transition temperature of the polymer block (B2) is preferably −100 to 40° C., more preferably −80 to 35° C., and still more preferably −70 to 30° C. When the glass transition temperature of the polymer block (B2) is within the above range, excellent flexibility is exhibited even at low temperatures. To ensure that the glass transition temperature of the polymer block (B2) will fall into the above preferred range and to take advantage of high availability, n-butyl acrylate, 2-ethylhexyl acrylate and n-octyl acrylate are preferable among the above acrylic acid alkyl esters.

Further, the acrylic block copolymer (II-1A) may include two or more polymer blocks (B2). In such a case, the polymer blocks (B2) may be composed of the same or different acrylic acid ester units.

The difference in glass transition temperature between the polymer block (A2) and the polymer block (B2) in the acrylic block copolymer (II-1A) is preferably 70° C. or more, and more preferably 100° C. or more.

The acrylic block copolymer (II-1A) is preferably represented by any of the general formulae below where "A2" is the polymer block (A2) and "B2" is the polymer block (B2):

(A2-B2)$_i$ (A2-B2)$_i$-A2

A2-(A2-B2)$_i$ (A2-B2)$_i$—Z (B2-A2)$_i$—Z

In the formulae, i is an integer of 1 to 30, and Z is a coupling site (a coupling site resulting from the formation of a chemical bond by the reaction of the polymer end with a coupling agent). The value of i is preferably 1 to 15, more preferably 1 to 8, and still more preferably 1 to 4.

Of the structures described above, those in which the polymer block (A2) is bonded to each of both ends of the polymer block (B2) are preferable.

Specifically, those represented by the following general formulae are preferable:

(A2-B2)$_k$ (A2-B2)$_i$-A2

B2-(A2-B2)$_k$ (A2-B2)$_k$—Z (B2-A2)$_k$—Z

In the formulae, i is an integer of 1 to 30, k is an integer of 2 to 30, and Z is a coupling site (a coupling site resulting from the formation of a chemical bond by the reaction of the polymer end with a coupling agent). The value of k is preferably 2 to 15, more preferably 2 to 8, and still more preferably 2 to 4. The value of i is preferably 1 to 15, more preferably 1 to 8, and still more preferably 1 to 4.

Of the above structures, linear block copolymers represented by (A2-B2)$_i$, (A2-B2)$_i$-A2, and A2-(A2-B2)$_i$ are more preferable. The diblock copolymer represented by A2-B2, and the triblock copolymer represented by A2-B2-A2 are still more preferable, and the triblock copolymer represented by A2-B2-A2 is particularly preferable. These may be used singly, or two or more may be used in combination.

It is preferable that the methyl methacrylate units contained in the acrylic block copolymer (II-1A) be all present exclusively in the polymer block (A2), and it is more preferable that the polymer block (A2) consist solely of the methyl methacrylate units. The content of the methyl methacrylate units in the acrylic block copolymer (II-1A) is preferably 35 to 60 mass %. If the content of the methyl methacrylate units is less than 35 mass %, the acrylic block copolymer (IT-1A) tends to exhibit strong tack and, when such a copolymer is mixed together with the acrylic block copolymer (I), the mixture may fail to keep the pellet shape when pelletized by, for example, cutting with an underwater cutter or the like. If the content of the methyl methacrylate units exceeds 60 mass %, flexibility tends to be deteriorated.

To obtain pellets with excellent flexibility, the content of the methyl methacrylate units in the acrylic block copolymer (II-1A) is preferably 35 to 57 mass %, and more preferably 37 to 54 mass %.

From the points of view of the compatibility with the acrylic block copolymer (I) and the processability of the obtainable pellets, the weight average molecular weight of the acrylic block copolymer (II-1A) is preferably 20,000 to 250,000, more preferably 30,000 to 200,000, still more preferably 40,000 to 180,000, and further preferably 50,000 to 160,000. If the weight average molecular weight of the acrylic block copolymer (II-1A) is less than 30,000, the cohesive force of the acrylic block copolymer (II-1A) may be insufficient, and shaped articles that are obtained may be inferior in properties such as durability. Other problems may arise such as the acrylic block copolymer (II-1A) bleeding on the surface of shaped articles that are obtained. If, on the other hand, the weight average molecular weight of the acrylic block copolymer (II-1A) exceeds 250,000, the melt viscosity is so increased that the productivity and processability may be deteriorated. Other problems may arise such as low compatibility with the acrylic block copolymer (I), and consequent poor transparency of the pellets that are obtained and of shaped articles that are obtained from the pellets, and variations in properties of the pellets that are obtained and of shaped articles that are obtained from the pellets.

In the acrylic block copolymer (II-1A), the molecular weight distribution (Mw/Mn) is preferably 1.0 to 1.5. When the molecular weight distribution of the acrylic block copolymer (II-1A) is in the above range, the acrylic block copolymer (II-1A) will exhibit an increased cohesive force and the pellets that are obtained tend to be unlikely to contaminate a mold during the molding process. From these points of view, the molecular weight distribution is more preferably 1.0 to 1.4, and still more preferably 1.0 to 1.3.

The MFR of the acrylic block copolymer (IT-1A) measured at 230° C. under 3.8 kg load is preferably not less than 20 g/10 min, and more preferably not less than 30 g/10 min. If the MFR falls below the lower limit, the miscibility with the acrylic block copolymer (I) is insufficient, and the compatibility and the transparency tend to be impaired. If the MFR is too high, the kneadability during processing tends to be insufficient due to the melt viscosity being low. In view of this, the MFR is preferably not more than 350 g/10 min, and more preferably not more than 300 g/10 min. In the case where the MFR is above the upper limit, sufficient melt kneading tends to be infeasible.

The acrylic block copolymers (I), (II-1) and (II-1A) may be produced by any production method in accordance with a known process without limitation. In general, a block copolymer having a narrow molecular weight distribution is obtained by the living polymerization of monomers as constituent units. Examples of such living polymerization processes include living polymerization using an organic rare earth metal complex as a polymerization initiator (see, for example, JP-A-H11-335432), living anionic polymerization using an organoalkali metal compound as a polymerization initiator in the presence of a mineral acid salt such as an alkali metal or alkaline earth metal salt (see, for example, JP-B-H07-25859), living anionic polymerization using an organoalkali metal compound as a polymerization initiator in the presence of an organoaluminum compound (see, for example, JP-A-H06-93060), and atom transfer radical polymerization (ATRP) (see, for example, Macromol. Chem. Phys., 2000, 201, pp. 1108-1114).

Among the above production processes, living anionic polymerization in the presence of an organoaluminum compound is advantageous in that the decrease in activity during the polymerization is small and thus the block copolymer obtained contains little homopolymers and has high transparency. Further, the block copolymer contains little residual monomers by virtue of the high rate of monomer to polymer conversion, and materials including such an acrylic block copolymer can be pelletized with suppressed generation of froths. Furthermore, the polymer block including methacrylic acid alkyl ester units has a highly syndiotactic molecular structure to effectively enhance the durability of pellets including the acrylic block copolymer that is obtained. Further, the living anionic polymerization is feasible under relatively mild temperature conditions and thus the environmental load in industrial production (mainly the electricity for refrigerators to control the polymerization temperature) is advantageously small. For these reasons, the acrylic block copolymers are preferably produced by living anionic polymerization using an organoalkali metal compound as a polymerization initiator in the presence of an organoaluminum compound.

In an example method of living anionic polymerization in the presence of an organoaluminum compound, (meth) acrylic acid esters may be polymerized in the presence of an organolithium compound and an organoaluminum compound represented by the following general formula (3):

$$AlR^3R^4R^5 \qquad (3)$$

wherein $R^3$, $R^4$ and $R^5$ are each independently an optionally substituted alkyl group, an optionally substituted cycloalkyl group, an optionally substituted aryl group, an optionally substituted aralkyl group, an optionally substituted alkoxyl group, an optionally substituted aryloxy group or an N,N-disubstituted amino group, or wherein $R^3$ represents any of the above groups and $R^4$ and $R^5$ together form an optionally substituted arylenedioxy group. Where necessary, the polymerization further involves an ether compound such as dimethyl ether, dimethoxyethane, diethoxyethane or 12-crown-4; and/or a nitrogen-containing compound such as triethylamine, N,N,N',N'-tetramethylethylenediamine, N,N,N',N'',N''-pentamethyldiethylenetriamine, 1,1,4,7,10,10-hexamethyltriethylenetetramine, pyridine or 2,2'-dipyridyl, in the reaction system.

Examples of the organolithium compounds include alkyllithiums and alkyldilithiums such as n-butyllithium, sec-butyllithium and tetramethylenedilithium; aryllithiums and aryldilithiums such as phenyllithium and xylyllithium; aralkyllithiums and aralkyldilithiums such as benzyllithium and dilithium formed by the reaction of diisopropenylbenzene and butyllithium; lithium amides such as lithium diisopropylamide; and lithium alkoxides such as methoxylithium.

From points of view such as high living properties during polymerization and easy handling, some preferred organoaluminum compounds represented by the general formula (3) are isobutylbis(2,6-di-tert-butyl-4-methylphenoxy)aluminum, isobutylbis(2,6-di-tert-butylphenoxy)aluminum and isobutyl[2,2'-methylenebis(4-methyl-6-tert-butylphenoxy)] aluminum.

⟨Acrylic Random Copolymers or Methyl Methacrylate Homopolymers (II-2)⟩

The acrylic random copolymer or the methyl methacrylate homopolymer (II-2) that may be included in the pellets of the present invention is an acrylic random copolymer (II-2A) including 35 mass % or more methyl methacrylate units, or a methyl methacrylate homopolymer (II-2B).

The acrylic random copolymer (II-2A) preferably includes methyl methacrylate units in a principal proportion, and more preferably includes methyl methacrylate units in a proportion of 80 mass % or more, still more preferably 90 mass % or more. The acrylic random copolymer (II-2A) having a content of methyl methacrylate units in the above range attains higher compatibility with the acrylic block copolymer (I) and tends to be more harmless on the superior characteristics of the acrylic block copolymer (I).

Further, the acrylic random copolymer (II-2A) may include additional monomer units other than methyl methacrylate. Examples of the additional monomers include methacrylic acid esters (except methyl methacrylate) such as ethyl methacrylate, n-propyl methacrylate, isopropyl methacrylate, n-butyl methacrylate, isobutyl methacrylate, sec-butyl methacrylate, tert-butyl methacrylate, amyl methacrylate, isoamyl methacrylate, n-hexyl methacrylate, 2-ethylhexyl methacrylate, pentadecyl methacrylate, dodecyl methacrylate, phenyl methacrylate, benzyl methacrylate, phenoxyethyl methacrylate, 2-hydroxyethyl methacrylate, 2-ethoxyethyl methacrylate, glycidyl methacrylate, allyl methacrylate, cyclohexyl methacrylate, norbornenyl methacrylate and isobornyl methacrylate; acrylic acid esters such as methyl acrylate, ethyl acrylate, n-propyl acrylate, isopropyl acrylate, n-butyl acrylate, isobutyl acrylate, sec-butyl acrylate, tert-butyl acrylate, amyl acrylate, isoamyl acrylate, n-hexyl acrylate, 2-ethylhexyl acrylate, pentadecyl acrylate, dodecyl acrylate, phenyl acrylate, benzyl acrylate, phenoxyethyl acrylate, 2-hydroxyethyl acrylate, 2-ethoxyethyl acrylate, glycidyl acrylate, allyl acrylate, cyclohexyl acrylate, norbornenyl acrylate and isobornyl acrylate; unsaturated carboxylic acids such as acrylic acid, methacrylic acid, maleic anhydride, maleic acid and itaconic acid; olefins such as ethylene, propylene, 1-butene, isobutylene and 1-octene; conjugated dienes such as butadiene, isoprene and myrcene; aromatic vinyl compounds such as styrene, α-methylstyrene, p-methylstyrene and m-methylstyrene; acrylamide, methacrylamide, acrylonitrile, methacrylonitrile, vinyl acetate, vinylpyridine, vinyl ketone, vinyl chloride, vinylidene chloride and vinylidene fluoride.

Among these additional monomers, methacrylic acid esters (except methyl methacrylate), acrylic acid esters and methacrylic acid are preferable. Methyl acrylate is more preferable for the reasons that methyl acrylate offers enhanced antiblocking performance and is easily available.

The content of the additional monomer units is preferably not more than 15 mass %, more preferably not more than 12 mass %, and still more preferably not more than 10 mass %.

The methyl methacrylate homopolymer (II-2B) is a polymer including only methyl methacrylate units, no other monomer units being contained. The methyl methacrylate homopolymer (II-2B) is more compatible with the acrylic block copolymer (I) and tends to be more harmless on the superior characteristics of the acrylic block copolymer (I).

The stereoregularity of the acrylic random copolymer (II-2A) or the methyl methacrylate homopolymer (II-2B) is not particularly limited and may be isotactic, heterotactic or syndiotactic.

The MFR of the acrylic random copolymer (II-2A) or the methyl methacrylate homopolymer (II-2B) measured at 230° C. under 3.8 kg load is preferably 10 to 400 g/10 min. If the MFR is less than 10 g/10 min, the antiblocking performance tends to be lowered due to the melt viscosity being high. If the MFR exceeds 400 g/10 min, the kneadability during processing tends to be insufficient due to the low melt viscosity.

The weight average molecular weight of the acrylic random copolymer (II-2A) or the methyl methacrylate homopolymer (II-2B) is preferably 50,000 to 150,000. When the weight average molecular weight is in the above range, the polymer exhibits good compatibility with the acrylic block copolymer (I) and offers high transparency when formed into pellets or shaped articles. From the point of view of the balance between the compatibility with the acrylic block copolymer (I) and the antiblocking performance, the weight average molecular weight is more preferably 60,000 to 130,000, and still more preferably 70,000 to 120,000.

The acrylic random copolymer (II-2A) may be a mixture of two or more copolymers having different compositions. Further, the acrylic random copolymer (II-2A) or the methyl methacrylate homopolymer (II-2B) may be a mixture of two or more kinds of polymers having different molecular weights or stereo regularities, or may be a mixture of polymers obtained by different production methods.

The acrylic random copolymer (II-2A) or the methyl methacrylate homopolymer (II-2B) (hereinbelow, (II-2A) and (II-2B) are also written collectively as the polymers (II-2)) may be produced by any method without limitation, for example, by solution polymerization, emulsion polymerization, bulk polymerization or the like. The initiator used at the polymerization is preferably a radical polymerization initiator. Examples of the radical polymerization initiators include azo compounds such as azobisisobutyronitrile (AIBN) and azobis-γ-dimethylvaleronitrile; and peroxides such as benzoyl peroxide, cumyl peroxide, peroxyneodecanoate, diisopropyl peroxydicarbonate, t-butyl cumyl peroxide, cumenehydroperoxide, t-butyl hydroperoxide, cyclohexanone peroxide, methyl ethyl ketone peroxide, dicumyl peroxide and lauroyl peroxide. The radical polymerization initiator is usually used in an amount of 0.05 to 0.5 parts by mass with respect to 100 parts by mass of all the monomers used in the production of the polymer (II-2). The polymerization is usually performed at a temperature of 50 to 140° C. for 2 to 20 hours. A chain transfer agent may be used to control the molecular weight of the polymer (II-2). Examples of the chain transfer agents include methyl mercaptan, ethyl mercaptan, isopropyl mercaptan, n-butyl mercaptan, t-butyl mercaptan, n-hexyl mercaptan, n-octyl mercaptan, n-dodecyl mercaptan, ethyl thioglycolate, mercaptoethanol, thio-β-naphthol and thiophenol. The chain transfer agent is usually used in the range of 0.005 to 0.5 mass % relative to all the monomers used in the production of the polymer (II-2).

Examples of commercially available products of the acrylic random copolymers (II-2A) or the methyl methacrylate homopolymers (II-2B) include "PARAPET (registered trademark) H1000B" (MFR: 22 g/10 min (230° C., 37.3 N)), "PARAPET (registered trademark) GF" (MFR: 15 g/10 min (230° C., 37.3 N)) [both are trade names, manufactured by KURARAY CO., LTD.], and "ACRYREX CM-211" (MFR: 16 g/10 min (230° C., 37.3 N)) [manufactured by CHIMEI].

The pellets of the present invention include the acrylic block copolymer (I) and the acrylic polymer (II), and the mass ratio (I)/(II) is 90/10 to 40/60. By virtue of the pellets including the acrylic block copolymer (I) and the acrylic polymer (II) in such a mass ratio, the blocking of the pellets is sufficiently prevented without sacrificing the superior characteristics of the acrylic block copolymer (I). To attain higher antiblocking performance and to allow the acrylic block copolymer (I) to exhibit its superior characteristics more effectively, the mass ratio (I)/(II) is preferably 85/15 to 50/50, and more preferably 80/20 to 60/40.

The total content of the acrylic block copolymer (I) and the acrylic polymer (II) included in the pellets of the present invention is preferably not less than 80 mass %, more preferably not less than 90 mass %, and particularly preferably 100 mass %.

In the production of the pellets of the present invention, other components such as additives may be added in addition to the acrylic block copolymer (I) and the acrylic polymer (II) while still ensuring that the characteristics of the acrylic block copolymer (I) and the acrylic polymer (II) are not impaired.

The pellets of the present invention may be produced by, for example, melt-extruding a mixture of the acrylic block copolymer (I), the acrylic polymer (II) and optionally other components into a strand, and cutting the strand with an underwater cutter, a center hot cutter, a strand cutter or the like into pellets. The melt-extruding is usually performed at 130 to 240° C.

The form of the pellets of the present invention is not particularly limited as long as the pellets can be produced into a shaped article described later. The pellets usually have a substantially cylindrical or substantially spherical (elliptical) form. The maximum diameter of the pellets obtained in the present invention is preferably 2 to 8 mm, and more preferably 2 to 6 mm. The maximum diameter of the pellets may be determined depending on the shape by measuring the maximum column height in the case of substantially cylindrical shape or the longest side across an ellipsoid in the case of substantially spherical shape, with use of a commercially available length-measuring gauge.

An antiblocking agent may be attached to the pellets of the present invention. For example, an antiblocking agent may be attached to the surface of the pellets by directly mixing the pellets with the antiblocking agent. Examples of the direct mixing devices include horizontal cylindrical mixers, twin-cylinder mixers, double conical mixers, ribbon mixers, conical screw mixers, high-speed flow type mixers, rotary disk type mixers, air flow stirring mixers, gravitational dropping mixers and stirring mixers. Alternatively, an antiblocking agent may be attached to the pellets by adding the pellets into an aqueous solution containing the antiblocking agent.

Examples of the antiblocking agents which may be used include ALFLOW H50T (manufactured by NOF CORPORATION, ethylenebisstearamide), Aerosil R972 (manufactured by Nippon Aerosil Co., Ltd., hydrophobic silicon dioxide), talc, calcium carbonate and acrylic resin microparticles. To prevent deterioration in properties such as transparency of shaped articles fabricated from the pellets of the present invention, it is preferable to use an antiblocking agent that does not include ethylenebisstearamide, talc or calcium carbonate. To concurrently satisfy antiblocking performance and transparency, the antiblocking agent is preferably added in such an amount that the concentration thereof with respect to the mass of the pellets will be 200 to 2000 ppm, and particularly preferably 300 to 1700 ppm.

⟨Shaped Articles⟩

Shaped articles of the present invention are articles produced by various shaping methods using the pellets described above as a feedstock.

Depending on factors such as purpose, the feedstock of the shaped articles of the present invention may optionally include, in addition to the pellets, additional components, for example, additional polymers and additives such as softeners, heat stabilizers, light stabilizers, UV absorbers, oxidation inhibitors, lubricants, antistatic agents, flame retardants, foaming agents, colorants, dyes, fluorescent agents, refractive index modifiers, fillers, curing agents, antiblocking agents, electrically conductive agents, thermally conductive agents, electromagnetic wave shielding agents and antibacterial agents. One, or two or more kinds of these optional components may be used in the shaped article.

The pellets are composed of the acrylic block copolymers and are thus excellent in weather resistance. Higher weather resistance may be imparted to the shaped articles of the present invention by adding oxidation inhibitors, UV absorbers and light stabilizers.

Examples of the oxidation inhibitors include phenolic oxidation inhibitors and phosphorus oxidation inhibitors. Examples of the UV absorbers include benzotriazole UV absorbers. Examples of the light stabilizers include hindered amine light stabilizers.

A single, or two or more kinds of these additives may be contained in the shaped article. In particular, it is preferable that the shaped article contain all of an oxidation inhibitor, a UV absorber and a light stabilizer.

The amount of each of the agents added to the shaped article is preferably 0.01 to 1.0 part by mass, and more preferably 0.03 to 0.60 parts by mass with respect to 100 parts by mass of the pellets.

Lubricants may be added for the purposes of imparting lubricity to the surface of the shaped articles and enhancing the scratch prevention effects. Examples of the lubricants include unsaturated fatty acid amides such as oleamide and erucamide; saturated fatty acid amides such as behenamide and stearamide; butyl stearate, stearyl alcohol, stearic acid monoglyceride, sorbitan monopalmitate, sorbitan monostearate, mannitol, stearic acid, zinc stearate, hydrogenated castor oil, stearamide, oleamide, ethylenebisstearamide, silicone oils and modified silicone oils. To concurrently satisfy transparency and lubricity on the surface of the shaped articles, silicone oils and modified silicone oils are preferable, and unreactive silicone oils having polyether-modified side chains are particularly preferable.

A single, or two or more kinds of lubricants may be contained in the shaped article. The amount of the lubricant added to the shaped article is preferably 0.01 to 1 part by mass, and more preferably 0.03 to 0.30 parts by mass with respect to 100 parts by mass of the pellets.

Examples of the additional polymers include acrylic resins such as polymethyl methacrylate and (meth)acrylic acid ester copolymers; olefin resins such as polyethylene, ethylene-vinyl acetate copolymer, polypropylene, polybutene-1, poly-4-methylpentene-1 and polynorbornene; ethylene ionomers; styrene resins such as polystyrene, styrene-maleic anhydride copolymer, high-impact polystyrene, AS resins, ABS resins, AES resins, AAS resins, ACS resins and MBS resins; styrene-methyl methacrylate copolymer; polyester resins such as polyethylene terephthalate, amorphous polyethylene terephthalate (PET-G), polybutylene terephthalate and polylactic acid; polyamides such as nylon 6, nylon 66 and polyamide elastomers; polycarbonates; polyvinyl chloride; polyvinylidene chloride; polyvinyl alcohols; ethylene-vinyl alcohol copolymers; polyacetals; polyvinylidene fluoride; polyurethanes; modified polyphenylene ethers; polyphenylene sulfide; silicone rubber-modified resins; acrylic rubbers; silicone rubbers; styrenic thermoplastic elastomers such as SEPS, SEBS and SIS; and olefin rubbers such as IR, EPR and EPDM. A single, or two or more kinds of additional polymers may be contained in the shaped article.

Examples of the fillers include inorganic fibers such as glass fibers and carbon fibers, and organic fibers; inorganic fillers such as calcium carbonate, talc, titanium oxide, silica, clay, barium sulfate, magnesium carbonate, magnesium hydroxide and aluminum hydroxide; and carbon blacks. A single, or two or more kinds of fillers may be contained in the shaped article.

The addition of inorganic fibers or organic fibers imparts durability to the shaped article that is obtained. The incorporation of inorganic fillers makes the obtainable shaped articles resistant to heat and weathering.

Further, titanium oxide will impart light shielding properties to the shaped article that is obtained. The amount of titanium oxide added to the shaped article is preferably 20 to 250 parts by mass, and more preferably 30 to 150 parts by mass with respect to 100 parts by mass of the pellets.

When the feedstock of the shaped article includes a curing agent, the shaped article of the present invention may be suitably used as a cured shaped article. For example, the curing agent may be a light curing agent such as a UV curing agent, or a heat curing agent, with examples including benzoins, benzoin ethers, benzophenones, anthraquinones, benzils, acetophenones and diacetyls. Specific examples include benzoin, α-methylolbenzoin, α-t-butylbenzoin, benzoin methyl ether, benzoin ethyl ether, benzoin-n-propyl ether, benzoin isopropyl ether, benzoin isobutyl ether, α-methylolbenzoin methyl ether, α-methoxybenzoin methyl ether, benzoin phenyl ether, benzophenone, 9,10-anthraquinone, 2-ethyl-9,10-anthraquinone, benzil, 2,2-dimethoxy-1, 2-diphenylethan-1-one (2,2-dimethoxy-2-phenylacetophenone) and diacetyl. A single, or two or more kinds of curing agents may be contained in the shaped article.

To increase the effect of the curing agent, the feedstock of the shaped article obtained in the present invention may further include monomers, for example, acrylic acid, methacrylic acid, α-cyanoacrylic acid, α-halogenated acrylic acid, crotonic acid, cinnamic acid, sorbic acid, maleic acid, itaconic acid, and esters such as acrylic acid esters, methacrylic acid esters, crotonic acid esters and maleic acid esters; acrylamide; methacrylamide; acrylamide derivatives such as N-methylol acrylamide, N-hydroxyethyl acrylamide and N,N-(dihydroxyethyl) acrylamide; methacrylamide derivatives such as N-methylol methacrylamide, N-hydroxyethyl methacrylamide and N,N-(dihydroxyethyl) methacrylamide; vinyl esters; vinyl ethers; mono-N-vinyl derivatives; and styrene derivatives; and oligomers including these monomers as constituent components. To attain higher durability, it is preferable to add esters such as acrylic acid esters, methacrylic acid esters, crotonic acid esters and maleic acid esters; vinyl ethers; styrene derivatives; and oligomers including these monomers as constituent components. In addition to these monomers, crosslinking agents including a difunctional or polyfunctional monomer or oligomer may be added.

The pellets of the present invention described above may be used directly as a feedstock of the shaped article of the present invention. When the feedstock of the shaped article of the present invention includes the pellets of the present invention and other optional components such as additional polymers and additives, it is recommended that these raw materials be melt mixed together beforehand to enhance the dispersibility of the components in the feedstock. For example, the melt mixing may be performed with a known device such as a kneader ruder, an extruder, a mixing roll or a Banbury mixer. In particular, the use of a twin-screw extruder is preferable from the point of view of enhancing the kneadability and compatibility between the pellets of the present invention and the optional components. The temperature at the time of mixing may be controlled appropriately in accordance with the types of the pellets of the present invention and the optional components, and may be usually in the range of 110° C. to 300° C. When the feedstock of the shaped article of the present invention includes the pellets of the present invention and optional components such as additional polymers and additives, the shaping feedstock may be provided in any form such as pellets or powder in the manner described above.

The shaped article of the present invention may be obtained by shaping the feedstock of the shaped article according to a generally used shaping method. Examples of the shaping methods include melt forming methods in which the feedstock is thermally melted, such as extrusion, injection molding, compression molding, blow molding, calendering and vacuum forming, and solution casting methods. Among these shaping methods, a melt forming method is preferable from points of view such as the handleability of the pellets of the present invention. By this shaping method, the shaped article may be obtained in any shape such as a molded article, a pipe, a sheet, a film, a fibrous material or a laminate having a polymer layer including the acrylic block copolymer (I) and the acrylic polymer (II).

The shaped article of the present invention may be a monolayer article. Such a monolayer article including the acrylic block copolymer (I) and the acrylic polymer (II) may be produced by extruding or injection molding the feedstock of the shaped article (for example, the pellets of the present invention). Examples of the extrusion methods include T-die methods and blown-film extrusion methods, with T-die methods being preferable. By extrusion, a monolayer article may be fabricated without using a solvent and the production is feasible with a relatively simple production facility. The production of a monolayer article by extrusion is advantageous in that the production steps are simplified and the cost of production of the monolayer article can be reduced.

In a T-die method, for example, a monolayer article may be produced by thermally melting the feedstock of the shaped article (for example, the pellets of the present invention) and extruding the melt from a T-die.

The shaped article of the present invention may be a laminate. A laminate that includes a substrate layer and a polymer layer including the acrylic block copolymer (I) and the acrylic polymer (II) may be produced by extruding the feedstock of the shaped article (for example, the pellets of the present invention) onto the substrate layer. Examples of the extrusion methods include T-die methods and blown-film extrusion methods, with T-die methods being preferable. By extrusion, a laminate may be fabricated without using a solvent and the production is feasible with a relatively simple production facility. The production of a laminate by extrusion is advantageous in that the production steps are simplified and the cost of production of the laminate can be reduced.

In an extrusion laminating method that is an example of the T-die methods, for example, a laminate that includes a substrate layer and a polymer layer including the acrylic block copolymer (I) and the acrylic polymer (II) may be produced by thermally melting the feedstock of the shaped article (for example, the pellets of the present invention) and extruding the melt from a T-die onto the substrate layer so as to laminate the polymer layer onto the substrate layer. In a coextrusion forming method that is another example of the T-die methods, for example, a laminate that includes a substrate layer and a polymer layer including the acrylic block copolymer (I) and the acrylic polymer (II) may be produced by thermally melting the feedstock of the polymer layer and the feedstock of the substrate layer, and extruding the melts concurrently.

To attain good adhesion with respect to the substrate layer, it is preferable in the extrusion laminating method that the feedstock of the shaped article be extruded at a temperature of 140 to 260° C. from the die.

Examples of the substrate layers include films and sheets of synthetic polymer compounds, metal foils, papers, cellophanes, nonwoven fabrics and woven fabrics. Examples of the synthetic polymer compounds include, but are not limited to, polyethylene terephthalate, polyethylene naphthalate, triacetylcellulose, polyamides, polyvinyl alcohols, polycarbonates, cycloolefin resins, styrene-methyl methacrylate copolymer, polyvinyl chloride, ethylene-vinyl acetate copolymer, polymethyl methacrylate, polyethylene, polypropylene, and mixtures of two or more of these polymers. The synthetic polymer compounds may be copolymers obtained by copolymerizing various monomers. Such films and sheets may be further coated by aluminum deposition, alumina deposition or silicon dioxide deposition. Further, the films and sheets of these synthetic polymer compounds may be further printed with urethane inks or the like.

Examples of the metal foils include aluminum foil and copper foil. Examples of the papers include kraft paper, woodfree paper and glassine paper. Examples of the nonwoven fabrics include nonwoven fabrics made of such materials as aramid fibers, glass fibers, cellulose fibers, nylon fibers, vinylon fibers, polyester fibers, polyolefin fibers and rayon fibers. Examples of the woven fabrics include woven fabrics made of such materials as aramid fibers, glass fibers, cellulose fibers, nylon fibers, vinylon fibers, polyester fibers, polyolefin fibers and rayon fibers.

Examples of the configurations of the laminates include, but are not limited to, a two-layered configuration composed of a substrate layer and a polymer layer including an acrylic block copolymer (I) and an acrylic polymer (II), a three-layered configuration composed of two substrate layers and a polymer layer including an acrylic block copolymer (I) and an acrylic polymer (II) (substrate layer/polymer layer/substrate layer), a four-layered configuration composed of a substrate layer, two dissimilar polymer layers (a) and (b) each including an acrylic block copolymer (I) and an acrylic polymer (II), and a substrate layer (substrate layer/polymer layer (a)/polymer layer (b)/substrate layer), a four-layered configuration composed of a substrate layer, a polymer layer (a) including an acrylic block copolymer (I) and an acrylic polymer (II), a polymer layer (c) made of a material other than the pellets of the present invention, and a substrate layer (substrate layer/polymer layer (a)/polymer layer (c)/substrate layer), and a five-layered configuration composed of three substrate layers and two polymer layers each including an acrylic block copolymer (I) and an acrylic polymer (II) (substrate layer/polymer layer/substrate layer/polymer layer/substrate layer).

In the laminates described above, the thickness ratio of the substrate layer to the polymer layer including an acrylic block copolymer (I) and an acrylic polymer (II) is not particularly limited. From the points of view of the durability and handleability of the obtainable laminate, it is preferable that substrate layer/polymer layer=1/1000 to 1000/1, and it is more preferable that the ratio be in the range of 1/200 to 200/1.

The bonding surface of the substrate layer on which the polymer layer including an acrylic block copolymer (I) and an acrylic polymer (II) will be placed in contact may be oxidized beforehand with air or ozone gas. To increase the adhesion with respect to the polymer layer, the bonding surface of the substrate layer may be treated by known surface treatment such as anchor coating treatment, corona discharge treatment, flame treatment or plasma treatment. Further, an anchor layer may be formed by applying an adhesive resin or the like onto the surface of at least one of the polymer layer and the substrate layer.

Examples of the resins used in the anchor layers include ethylene-vinyl acetate copolymer, ethylene-methyl methacrylate copolymer, ionomers, block copolymers (such as, for example, styrene triblock copolymers such as SIS and SBS, and diblock copolymers), ethylene-acrylic acid copolymer and ethylene-methacrylic acid copolymer. There may be one, or two or more anchor layers.

The anchor layer may be formed by any method without limitation. For example, an anchor layer may be formed by applying a solution of the above resin onto the substrate layer, or by thermally melting an anchoring composition which contains components including the above resin and applying the melt through a T-die or the like to form an anchor layer on the surface of the substrate layer.

The coextrusion forming method, which is an example of the T-die methods, may be a feedblock process or a multi-manifold process. The process can produce a multilayered structure such as a bilaminar structure including two dissimilar layers consisting of a substrate layer and a polymer layer including an acrylic block copolymer (I) and an acrylic polymer (II), or a trilaminar structure including three dissimilar layers consisting of a substrate layer, a polymer layer described above and an intermediate layer in between.

Examples of the materials of the substrate layers in the coextrusion forming method include various synthetic polymer compounds. A preferred example of the synthetic polymer compounds is polyolefins.

Examples of the polyolefin materials include low-density polyethylene, medium-density polyethylene, high-density polyethylene, linear low-density polyethylene, ethylene-α-olefin copolymers, ethylene-vinyl acetate copolymer, ethylene-ethyl acrylate copolymer, ethylene-methyl methacrylate copolymer, ethylene-n-butyl acrylate copolymer, and polypropylenes (homopolymers, random copolymers and block copolymers). The polyolefin materials may be used singly or may be combined appropriately to form a mixture or a composition. In particular, a polypropylene in the form of a block copolymer is preferable as the material for the substrate layer.

Where necessary, the substrate layer may contain additives such as pigments, antioxidants, stabilizers and UV absorbers. Further, in the laminates described above, the substrate layer is not limited to a monolayer and may be a unit of substrate layers. For example, the total thickness of the substrate layer that is a monolayer or a unit of layers is preferably not less than 20 μm and not more than 100 μm.

Further, the laminate may have an intermediate layer. Some example resins that may be used as the intermediate layers are ethylene-vinyl acetate copolymer, ethylene-methyl methacrylate copolymer, ionomers, block copolymers (such as, for example, styrene triblock copolymers such as SIS and SBS, and diblock copolymers), ethylene-acrylic acid copolymer and ethylene-methacrylic acid copolymer. There may be one, or two or more intermediate layers. The intermediate layers may be formed by coextrusion concurrently with the substrate layer and the polymer layer including an acrylic block copolymer (I) and an acrylic polymer (II).

The shaped article of the present invention may be a multilayer article in a form such as a molded article or a sheet. In such a case, the feedstock of the shaped article (for example, the pellets of the present invention) may be injection molded to form a multilayer article composed of a polymer layer (Z) including an acrylic block copolymer (I) and an acrylic polymer (II), and a polymer layer (Y) made of a material other than the pellets of the present invention. Examples of the injection molding methods include two-color molding and insert molding.

Examples of the polymers for forming the polymer layer (Y) (hereinafter, also written as the layer (Y)) made of a material other than the pellets of the present invention include acrylic resins such as polymethyl methacrylate and (meth)acrylic acid ester copolymers; olefin resins such as polyethylene, ethylene-vinyl acetate copolymer, polypropylene, polybutene-1, poly-4-methylpentene-1 and polynorbornene; ethylene ionomers; styrene resins such as polystyrene, styrene-maleic anhydride copolymer, high-impact polystyrene, AS resins, ABS resins, AES resins, AAS resins, ACS resins and MBS resins; styrene-methyl methacrylate copolymer; polyester resins such as polyethylene terephthalate, amorphous polyethylene terephthalate (PET-G), polybutylene terephthalate and polylactic acid; polyamides such as nylon 6, nylon 66 and polyamide elastomers; polycarbonates; polyvinyl chloride; polyvinylidene chloride; polyvinyl alcohols; ethylene-vinyl alcohol copolymers; polyacetals; polyvinylidene fluoride; polyurethanes; modified polyphenylene ethers; polyphenylene sulfide; silicone rubber-modified resins; acrylic rubbers; silicone rubbers; styrenic thermoplastic elastomers such as SEPS, SEBS and SIS; and olefin rubbers such as IR, EPR and EPDM. The multilayer articles may include an additional layer other than the polymer layer (Z) (hereinafter, also written as the layer (Z)) including an acrylic block copolymer (I) and an acrylic polymer (II), and the layer (Y).

Examples of the layers (Y) include layers (YI) containing a polar resin. Examples of the polar resins include acrylic resins such as polymethyl methacrylate and (meth)acrylic acid ester copolymers; styrene resins such as polystyrene, styrene-maleic anhydride copolymer, high-impact polystyrene, AS resins, ABS resins, AES resins, AAS resins, ACS resins and MBS resins; styrene-methyl methacrylate copolymer; polyester resins such as polyethylene terephthalate, amorphous polyethylene terephthalate (PET-G), polybutylene terephthalate and polylactic acid; polyamides such as nylon 6, nylon 66 and polyamide elastomers; polycarbonates; polyvinyl chloride; polyvinylidene chloride; polyvinyl alcohols; ethylene-vinyl alcohol copolymers; polyacetals; polyvinylidene fluoride; polyurethanes; modified polyphenylene ethers; polyphenylene sulfide; silicone rubber-modified resins; acrylic rubbers; and silicone rubbers.

In the multilayer article, it is preferable that the layer (Z) and the layer (YI) be adjacent to each other. In the multilayer article, the layer (Z) has excellent low-tack properties, transparency, flexibility and impact absorbing properties. Even in the case where the polar resin layer (YI) includes a highly rigid polar resin, the multilayer article can still exhibit excellent flexibility and impact absorbing properties.

The thicknesses of the layer (Z) and the layer (Y) constituting the multilayer article are not particularly limited. To ensure that the shaped article attains excellent flexibility and impact absorbing properties, the thickness of the layer (Z) is preferably 0.1 to 10 mm, more preferably 0.3 to 5 mm, and still more preferably 0.5 to 3 mm, and may be 0.7 to 2 mm, or 1 to 1.5 mm. The thickness of the layer (Y) is preferably 0.3 to 10 mm, more preferably 0.5 to 5 mm, and still more preferably 1 to 3 mm.

Specifically, for example, the multilayer article may be produced by forming a layer (Z) and a layer (Y) separately beforehand and stacking these layers (method 1); applying a melt of the pellets of the present invention onto a previously formed layer (Y) to form a layer (Z) (method 2); or applying a molten polymer onto a previously formed layer (Z) to form a layer (Y) (method 3). Among these, the methods 2 and 3 are preferable for reasons such as because the bond strength between the layer (Z) and the layer (Y) is enhanced, and the method 2 is more preferable for reasons such as because the target shaped article can be obtained easily. Further, since the pellets of the present invention have excellent melt fluidity, it is preferable that the layer (Z) be formed by injection molding or, in particular, more preferably by insert molding in which a previously formed layer (Y) is arranged in a mold and a melt of the pellets of the present invention is injected.

The use applications of the shaped articles of the present invention are not particularly limited. Due to their excellent heat resistance, transparency, flexibility and appearance, the shaped articles may be used in numerous applications such as optical fields, food fields, medical fields, consumer fields, automobile fields, electric and electronic fields, and construction fields.

The shaped articles may be of numerous shapes, with examples including pellets, sheets, plates, pipes, tubes, belts, hoses, rods and granules.

In the automobile fields, for example, the shaped articles may be used for automobile interior and exterior members such as car audio panels, instrument panels, dashboards, airbag covers, bumper parts, body panels, weather strips, grommets, glass run channels, rack & pinion boots, suspension boots, constant velocity joint boots, side moldings, mud guards, emblems, leather seats, floor mats, armrests, steering wheel covers, belt line moldings, flash mounts, gears and knobs. Entirely new functions, shapes and designs may be imparted to these members by taking benefits of flexibility or transparency.

In the electric and electronic fields, the shaped articles may be used as covers on electronic devices. By virtue of excellent heat resistance, for example, the shaped articles as smartphone covers can resist deformation due to heat generation of smartphone terminals or the like. Further, excellent transparency and flexibility allow such covers on electronic devices to be shaped and designed freely, and also to be easily attached and detached.

In addition to the above applications, the shaped articles may be suitably applied to, for example, various covers, various terminal plates, printed circuit boards, finders, filters, prisms and Fresnel lenses in speakers, microscopes, binoculars, cameras, timepieces, VTRs, projection TVs and the like, various optical disc (such as VD, CD, DVD, MD and LD) substrate protective films, optical switches, optical connectors, liquid crystal displays, liquid crystal display light guide films and sheets, flat panel displays, flat panel display light guide films and sheets, plasma displays, plasma display light guide films and sheets, retardation films and sheets, polarizing films and sheets, polarizer protective films and sheets, wave plates, light diffusing films and sheets, prism films and sheets, reflective films and sheets, antireflective films and sheets, viewing angle enlarging films and sheets, antiglare films and sheets, luminance improving films and sheets, liquid crystal or electroluminescence display element substrates, touch panels, touch panel light guide films and sheets, and spacers between various front plates and various modules.

Further, the shaped articles may be used in, for example, various liquid crystal display devices, electroluminescence display devices and touch panels such as mobile phones, digital information terminals, pocket bells, navigation systems, in-vehicle liquid crystal displays, liquid crystal monitors, dimming panels, OA device displays and AV device displays.

Furthermore, the shaped articles have excellent properties such as heat resistance and flexibility, and thus may be suitably applied to, for example, interior and exterior members for construction, such as curtain walls, roofing members, roofing materials, window members, gutters, exteriors, wall materials, flooring materials, fixture materials, coated steel plates, coated plywood, and sealing packings for doors and window frames.

Further, the shaped articles may also be applied to, for example, road construction members, retroreflective films and sheets, light-shielding films and sheets, heat-shielding films and sheets, agricultural films and sheets, lighting covers, signboards and translucent sound insulation walls.

Furthermore, the shaped articles may be effectively used in a wide range of applications including various vibration insulating rubbers and vibration damping members such as anti-vibration rubbers, mats, sheets, cushions, dampers, pads and mount rubbers; footwear materials such as sports shoes and fashion sandals; home appliance members such as those in televisions, stereos, vacuum cleaners and refrigerators; grips such as those of scissors, drivers, toothbrushes, pens, cameras and ski poles; office equipment parts such as copy machine feed rollers and take-up rollers; furniture such as sofas and chair sheets; parts such as switch covers, casters, stoppers, feet rubbers and earphones; sports equipment such as underwater glasses, snorkels, ski boots, snowboard boots, ski board and snowboard skin materials, and golf ball covers; industrial materials such as conveyor belts, electric belts and pelletizer rolls; stretching members in sanitary materials such as diapers, poultice materials and bandages; band applications such as hair bands, wrist bands, watch bands and eyeglass bands; food packaging materials such as food wrapping films; medical items such as infusion bags, syringes, catheters and rolling tubes; plugs for containers for storing foods, beverages, medicines and the like; and others such as snow chains, wire coverings, trays, films, sheets, stationery, toys and daily miscellaneous goods.

Further, the laminates constituting an example of the shaped articles of the present invention may be used in various applications. Examples of such applications include adhesive tapes and adhesive films for surface protection, masking, wrapping/packaging, office uses, labels, decoration/display, book binding, dicing tapes, medical/sanitary uses, laminated glasses, prevention of glass scattering, electrical insulation, holding and fixing of electronic equipment, semiconductor manufacturing, optical display films, adhesive optical films, shielding of electromagnetic waves, and sealing materials of electric and electronic parts. Specific examples are given below.

The adhesive tapes or films for surface protection may be used for various materials such as metals, plastics, rubbers and wood, and specifically may be used for the surface protection of coating surfaces, metals during plastic working or deep drawing, automobile parts and optical parts. Examples of the automobile parts include coated exterior plates, wheels, mirrors, windows, lights and light covers. Examples of the optical parts include various image display devices such as liquid crystal displays, organic EL displays, plasma displays and field emission displays; optical disk constitutional films such as polarizing films, polarizing plates, retardation plates, light guide panels, diffusion plates and DVD; and fine coat faceplates for electronic/optical uses.

Exemplary uses for masking applications include masking during the manufacturing of printed wiring boards or flexible printed wiring boards; masking during a plating or soldering treatment for electronic equipment; and masking during the manufacturing of vehicles such as automobiles, during the coating of vehicles and buildings, during textile printing, and during trimming of civil engineering works.

Exemplary uses for wrapping applications include heavy material packaging, packaging for export, sealing of corrugated fiberboard boxes and sealing of cans. Examples of the office applications include general uses for office work, and uses for sealing, mending of books, drawing and memos. Exemplary uses for label applications include price displays, merchandise displays, tags, POP, stickers, stripes, nameplates, decoration, advertisement and marking films.

Examples of the label applications include labels having such substrate layers as, for example, papers such as paper, converted paper (paper subjected to aluminum deposition, aluminum lamination, varnishing, resin treatment or the like) and synthetic paper; and films made of cellophane, plastic materials, fabrics, wood or metals. Examples of the substrate layers include woodfree paper, art paper, cast-coated paper, thermal paper, foil paper, polyethylene terephthalate films, polyvinyl chloride films, OPP films, polylactic acid films, synthetic paper, thermal synthetic paper and overlaminate films.

Some example adherends for the labels include plastic products such as plastic bottles and foamed plastic cases; paper or corrugated fiberboard products such as corrugated fiberboard boxes; glass products such as glass bottles; metal products; and products made of other inorganic materials such as ceramics.

Exemplary uses for decoration/display applications include danger display seals, line tapes, wiring markings, after-glow luminous adhesive tapes and reflecting sheets.

Examples of the applications as adhesive optical films include adhesive layers formed on at least part or the entirety of one or both sides of such optical films as polarizing films, polarizing plates, retardation films, viewing angle enlarging films, luminance improving films, antireflection films, antiglare films, color filters, light guide panels, diffusion films, prism sheets, electromagnetic wave shielding films, near infrared absorbing films, functional composite optical films, films for ITO lamination, impact resistance imparting films, and visibility improving films. The adhesive optical films may be protective films used for the protection of the surface of the above optical films. The adhesive optical films are suitably used in various image display devices such as liquid crystal display devices, PDP, organic EL display devices, electronic papers, game machines and mobile terminals.

Exemplary uses for electrical insulation include protective covering or insulation of coils, and layer insulation such as motor/transformer layer insulation. Exemplary uses for holding and fixing of electrical equipment include carrier tapes, packaging, fixing of cathode ray tubes, splicing and rib reinforcement. Exemplary uses for the production of semiconductors include protection of silicon wafers.

Examples of medical and sanitary uses include uses for percutaneous absorbent drugs, such as analgesic anti-inflammatory agents (plasters, poultices), plasters for cold, antipruritic patches and keratin softening agents; uses for various tapes, such as first-aid plasters (containing germicides), surgical dressings/surgical tapes, plasters, hemostatic tapes, tapes for human waste disposal devices (artificial anus fixing tapes), tapes for stitching, antibacterial tapes, fixing tapings, self-adhesive bandages, adhesive tapes for oral mucosa, tapes for sporting, and depilatory tapes; uses for beauty, such as facial packs, moistening sheets for skin round the eye and keratin peel packs; binding uses in sanitary materials such as diapers and sheets for pets; cooling sheets, pocket body warmers, and uses for dust proofing, waterproofing and noxious insect capture.

Exemplary uses for sealing materials of electronic/electric parts include liquid crystal displays, organic EL displays, organic EL lights and solar cells.

The laminates may be effectively used in laminated glass applications such as automobile windshields, automobile side glasses, automobile sunroofs, automobile rear glasses and head-up display glasses.

EXAMPLES

The present invention will be described in detail based on Examples hereinbelow. However, it should be construed that the scope of the present invention is not limited thereto. In Examples and Comparative Examples, properties were measured or evaluated by the following methods.

(Weight Average Molecular Weight (Mw), Number Average Molecular Weight (Mn) and Molecular Weight Distribution (Mw/Mn))

The weight average molecular weight and number average molecular weight of acrylic block copolymers were determined as polystyrene-equivalent molecular weights by gel permeation chromatography (hereinafter, abbreviated as GPC). The molecular weight distribution was calculated from these molecular weights. The details of the molecular weight measurement conditions are as follows.

Device: GPC device "HLC-8020" manufactured by TOSOH CORPORATION.
Separation columns: "TSKgel GMHXL", "G4000HXL" and "G5000HXL" manufactured by TOSOH CORPORATION were connected in series.
Eluent: Tetrahydrofuran.
Eluent flow rate: 1.0 ml/min.
Column temperature: 40° C.
Detection method: Differential refractive index (RI).

(Proportions of Polymer Blocks)

The proportions of polymer blocks were determined by $^1$H-NMR measurement.

Device: Nuclear magnetic resonance apparatus "JNM-LA400" manufactured by JEOL Ltd.
Deuterated solvent: Deuterated chloroform.

In a $^1$H-NMR spectrum, signals at near 3.6 ppm, 3.7 ppm and 4.0 ppm are assigned to hydrogen atoms (—O—C$\underline{H}_3$) bonded to the carbon atom adjacent to the oxygen atom in the ester group of methyl methacrylate units, hydrogen atoms (—O—C$\underline{H}_3$) bonded to the carbon atom adjacent to the oxygen atom in the ester group of methyl acrylate units, and hydrogen atoms (—O—C$\underline{H}_2$—CH$_2$—CH$_2$—CH$_3$) bonded to the carbon atom adjacent to the oxygen atom in the ester group of n-butyl acrylate units, respectively. The molar ratio of the respective monomer units was obtained from the ratio of the integrals of these signals, and was converted to the mass ratio based on the molecular weights of the monomer units. The contents of the respective polymer blocks were thus determined.

(Melt Flow Rate)

The melt flow rate (MFR) of polymers obtained in Examples and Comparative Examples was measured in accordance with ISO 1133 at 230° C. under a load of 3.8 kg for a measurement time of 10 minutes.

(Evaluation of Antiblocking Properties of Pellets)

Pellets obtained in Example or Comparative Example were transferred to a 100 ml plastic beaker, and a weight was placed thereon so that the load per unit area would be 103 g/cm$^2$. The beaker was then stored in a dryer at 40° C. for one week, and the state of blocking was visually evaluated while taking out the pellets from the plastic beaker.

AA: The pellets were completely loose.
A: Some of the pellets formed lumps but were easily disassembled when touched with a finger.
B: Some of the pellets formed lumps and were not easily broken even when touched with a finger.

(Evaluation of Transparency of Pellets)

Pellets obtained in Example or Comparative Example were visually observed.

a: The pellets were highly transparent without any cloudiness.
b: The pellets were slightly cloudy.

(Evaluation of compatibility in pressed sheets)

Pressed sheets fabricated in Examples 32 to 36 were visually observed.

1: The sheet was highly transparent without any cloudiness, thus showing high compatibility.
2: The sheet was slightly clouded but indicated fair compatibility.
3: The sheet was significantly clouded and indicated low compatibility.

《Production Example 1》 [Production of Acrylic Triblock Copolymer (I-1)]

(1) A three-way cock was attached to a 2 L three-necked flask, and the inside was purged with nitrogen.

Thereafter, while performing stirring at room temperature, the flask was charged with 938 g of toluene and 20.2 g of 1,2-dimethoxyethane, subsequently charged with 41.4 g of a toluene solution containing 20.8 mmol of isobutylbis(2,6-di-t-butyl-4-methylphenoxy)aluminum, and further charged with 1.53 g of a sec-butyllithium in cyclohexane solution containing 2.60 mmol of sec-butyllithium.

(2) Subsequently, 21.8 g of methyl methacrylate was added at room temperature while performing stirring, and the mixture was continuously stirred for 60 minutes. The reaction solution was yellow at first and became colorless after the 60 minutes of stirring.

(3) Thereafter, the internal temperature of the polymerization solution was cooled to −30° C., and 246 g of a mixture liquid containing methyl acrylate and n-butyl acrylate (50/50 by mass) was added dropwise over a period of 2 hours while performing stirring. After the completion of the dropwise addition, the mixture was continuously stirred at −30° C. for 5 minutes.

(4) Thereafter, 25.2 g of methyl methacrylate was added, and the mixture was stirred at room temperature overnight.

(5) The polymerization reaction was terminated by the addition of 12.2 g of methanol. The reaction solution obtained was poured into 15 kg of methanol while performing stirring to precipitate a white deposit. The white deposit was then recovered and dried. Thus, 260 g of an acrylic triblock copolymer (I-1) was obtained. The acrylic triblock copolymer (I-1) was analyzed by GPC in accordance with the process described hereinabove to determine the weight average molecular weight (Mw) and the number average molecular weight (Mn), from which the molecular weight distribution (Mw/Mn) was calculated. Further, the total content of the polymer blocks composed of methyl methacrylate units in the acrylic triblock copolymer (I-1) was determined by the $^1$H-NMR measurement described hereinabove. The properties of the acrylic triblock copolymer (I-1) are described in Table 1.

《Production Example 2》 [Production of Acrylic Triblock Copolymer (I-2)]

(1) A three-way cock was attached to a 2 L three-necked flask, and the inside was purged with nitrogen.

Thereafter, while performing stirring at room temperature, the flask was charged with 938 g of toluene and 20.2 g of 1,2-dimethoxyethane, subsequently charged with 41.4 g of a toluene solution containing 20.8 mmol of isobutylbis(2,6-di-t-butyl-4-methylphenoxy)aluminum, and further charged with 1.53 g of a sec-butyllithium in cyclohexane solution containing 2.60 mmol of sec-butyllithium. (2) Subsequently, 21.8 g of methyl methacrylate was added at room temperature while performing stirring, and the mixture was continuously stirred for 60 minutes. The reaction solution was yellow at first and became colorless after the 60 minutes of stirring.

(3) Thereafter, the internal temperature of the polymerization solution was cooled to −30° C., and 246 g of a mixture liquid containing methyl acrylate and n-butyl acrylate (75/25 by mass) was added dropwise over a period of 2 hours while performing stirring. After the completion of the dropwise addition, the mixture was continuously stirred at −30° C. for 5 minutes.

(4) Thereafter, 25.2 g of methyl methacrylate was added, and the mixture was stirred at room temperature overnight.

(5) The polymerization reaction was terminated by the addition of 12.2 g of methanol. The reaction solution obtained was poured into 15 kg of methanol while performing stirring to precipitate a white deposit. The white deposit was then recovered and dried. Thus, 260 g of an acrylic triblock copolymer (I-2) was obtained. The acrylic triblock copolymer (I-2) was analyzed by GPC in accordance with the process described hereinabove to determine the weight average molecular weight (Mw) and the number average molecular weight (Mn), from which the molecular weight distribution (Mw/Mn) was calculated. Further, the total content of the polymer blocks composed of methyl methacrylate units in the acrylic triblock copolymer (I-2) was determined by the $^1$H-NMR measurement described hereinabove. The properties of the acrylic triblock copolymer (I-2) are described in Table 1.

《Production Example 3》 [Production of Acrylic Triblock Copolymer (II-1A-1)]

(1) A three-way cock was attached to a 2 L three-necked flask, and the inside was purged with nitrogen.

Thereafter, while performing stirring at room temperature, the flask was charged with 936 g of toluene and 51.4 g of 1,2-dimethoxyethane, subsequently charged with 32.9 g of a toluene solution containing 16.5 mmol of isobutylbis (2,6-di-t-butyl-4-methylphenoxy)aluminum, and further charged with 4.10 g of a sec-butyllithium in cyclohexane solution containing 7.00 mmol of sec-butyllithium.

(2) Subsequently, 65.0 g of methyl methacrylate was added at room temperature while performing stirring, and the mixture was continuously stirred for 60 minutes. The reaction solution was yellow at first and became colorless after the 60 minutes of stirring.

(3) Thereafter, the internal temperature of the polymerization solution was cooled to −30° C., and 226 g of n-butyl acrylate was added dropwise over a period of 2 hours while performing stirring. After the completion of the dropwise addition, the mixture was continuously stirred at −30° C. for 5 minutes.

(4) Thereafter, 161 g of methyl methacrylate was added, and the mixture was stirred at room temperature overnight.

(5) The polymerization reaction was terminated by the addition of 13.7 g of methanol. The reaction solution obtained was poured into 15 kg of methanol while performing stirring to precipitate a white deposit. The white deposit was then recovered and dried. Thus, 430 g of an acrylic triblock copolymer (II-1A-1) was obtained. The acrylic triblock copolymer (II-1A-1) was analyzed by GPC in accordance with the process described hereinabove to determine the weight average molecular weight (Mw) and the number average molecular weight (Mn), from which the molecular weight distribution (Mw/Mn) was calculated. Further, the total content of the polymer blocks composed of methyl methacrylate units in the acrylic triblock copolymer (II-1A-1) was determined by the $^1$H-NMR measurement described hereinabove. The properties of the acrylic triblock copolymer (TT-1A-1) are described in Table 2.

《Production Example 4》 [Production of Acrylic Triblock Copolymer (II-1A-2)]

(1) A three-way cock was attached to a 2 L three-necked flask, and the inside was purged with nitrogen.

Thereafter, while performing stirring at room temperature, the flask was charged with 1029 g of toluene and 51.4 g of 1,2-dimethoxyethane, subsequently charged with 32.9 g of a toluene solution containing 16.5 mmol of isobutylbis (2,6-di-t-butyl-4-methylphenoxy)aluminum, and further charged with 4.51 g of a sec-butyllithium in cyclohexane solution containing 7.70 mmol of sec-butyllithium.

(2) Subsequently, 50.0 g of methyl methacrylate was added at room temperature while performing stirring, and the mixture was continuously stirred for 60 minutes. The reaction solution was yellow at first and became colorless after the 60 minutes of stirring.

(3) Thereafter, the internal temperature of the polymerization solution was cooled to −30° C., and 209 g of n-butyl acrylate was added dropwise over a period of 2 hours while performing stirring. After the completion of the dropwise addition, the mixture was continuously stirred at −30° C. for 5 minutes.

(4) Thereafter, 82.0 g of methyl methacrylate was added, and the mixture was stirred at room temperature overnight.

(5) The polymerization reaction was terminated by the addition of 13.7 g of methanol. The reaction solution obtained was poured into 15 kg of methanol while performing stirring to precipitate a white deposit. The white deposit was then recovered and dried. Thus, 330 g of an acrylic triblock copolymer (II-1A-2) was obtained. The acrylic triblock copolymer (II-1A-2) was analyzed by GPC in accordance with the process described hereinabove to determine the weight average molecular weight (Mw) and the number average molecular weight (Mn), from which the molecular weight distribution (Mw/Mn) was calculated. Further, the total content of the polymer blocks composed of methyl methacrylate units in the acrylic triblock copolymer (II-1A-2) was determined by the $^1$H-NMR measurement described hereinabove. The properties of the acrylic triblock copolymer (II-1A-2) are described in Table 2.

《Production Example 5》 [Production of Acrylic Triblock Copolymer (III-1)]

(1) A three-way cock was attached to a 2 L three-necked flask, and the inside was purged with nitrogen.

Thereafter, while performing stirring at room temperature, the flask was charged with 936 g of toluene and 51.4 g of 1,2-dimethoxyethane, subsequently charged with 32.9 g of a toluene solution containing 16.5 mmol of isobutylbis (2,6-di-t-butyl-4-methylphenoxy)aluminum, and further charged with 3.88 g of a sec-butyllithium in cyclohexane solution containing 6.62 mmol of sec-butyllithium.

(2) Subsequently, 52.9 g of methyl methacrylate was added at room temperature while performing stirring, and the mixture was continuously stirred for 60 minutes. The reaction solution was yellow at first and became colorless after the 60 minutes of stirring.

(3) Thereafter, the internal temperature of the polymerization solution was cooled to −30° C., and 226 g of n-butyl acrylate was added dropwise over a period of 2 hours while performing stirring. After the completion of the dropwise addition, the mixture was continuously stirred at −30° C. for 5 minutes.

(4) Thereafter, 46.2 g of methyl methacrylate was added, and the mixture was stirred at room temperature overnight.

(5) The polymerization reaction was terminated by the addition of 13.7 g of methanol. The reaction solution obtained was poured into 15 kg of methanol while performing stirring to precipitate a white deposit. The white deposit was then recovered and dried. Thus, 300 g of an acrylic triblock copolymer (III-1) was obtained. The acrylic triblock copolymer (III-1) was analyzed by GPC in accordance with the process described hereinabove to determine the weight average molecular weight (Mw) and the number average molecular weight (Mn), from which the molecular weight distribution (Mw/Mn) was calculated. Further, the total content of the polymer blocks composed of methyl methacrylate units in the acrylic triblock copolymer (III-1) was determined by the $^1$H-NMR measurement described hereinabove. The properties of the acrylic triblock copolymer (III-1) are described in Table 2.

《 Production Example 6》 [Production of Acrylic Resin Microparticles]

An acrylic resin (content of methyl methacrylate units: 90 mass %, weight average molecular weight: 85,000) was primarily pulverized with an impact crusher (ACM Pulverizer-10 manufactured by HOSOKAWA MICRON CORPORATION) and secondarily pulverized with a counter jet mill (200 AFG manufactured by HOSOKAWA MICRON CORPORATION) to give acrylic resin microparticles having a D50 value in the particle size distribution of 6 m.

Table 1 describes the block structures, weight average molecular weights (Mw), molecular weight distributions (Mw/Mn), total contents of PMMA polymer blocks (polymer blocks composed of 100 mass % of methyl methacrylate units) constituting the polymer blocks (A1), components constituting the polymer block (B1), and mass ratio in the polymer block (B1), of the acrylic triblock copolymers (I-1) and (I-2) obtained in Production Examples 1 and 2. In Table 1, PMMA means a polymer block composed of 100 mass % of methyl methacrylate units, and PMA/PnBA a block consisting solely of methyl acrylate units and n-butyl acrylate units.

Table 2 describes the block structures, weight average molecular weights (Mw), molecular weight distributions (Mw/Mn), total contents of methyl methacrylate units, and MFR measured at a temperature of 230° C. under a load of 3.8 kg, of the acrylic triblock copolymers (II-1A-1), (II-1A-2) and (III-1) obtained in Production Examples 3 to 5. In Table 2, PMMA means a polymer block composed of 100 mass % of methyl methacrylate units, and PnBA a block composed of 100 mass % of n-butyl acrylate units.

dry blended beforehand in a ratio described in Table 3 to give a mixture. The mixture was melt-kneaded with a twin-screw extruder ("JSW-JBa II" manufactured by The Japan Steel Works, LTD.). The resultant melt-kneaded product was extruded from the twin-screw extruder and was pelletized with an underwater cutter. Pellets (A'-1, 2 and 6 to 12) were thus obtained. Thereafter, the pellets (A'-1, 2 and 6 to 12) were dusted with Aerosil R972 so that the concentration of the powder relative to the mass of the pellets would be as described in Table 3. Pellets (A-1, 2 and 6 to 12) were thus obtained. The transparency of the pellets obtained was good, rated as "a". Regarding antiblocking properties, the pellets obtained exhibited good antiblocking properties, rated as "A" or "AA", and were shown to have excellent handleability. The results are described in Table 3.

Examples 3 to 5

The acrylic triblock copolymer (I-1) obtained and the acrylic triblock copolymer (II-1A-1) were dry blended beforehand in a ratio described in Table 3 to give a mixture. The mixture was melt-kneaded with a twin-screw extruder ("ZSK-25" manufactured by KRUPP WERNER & PFLEIDERER). The resultant melt-kneaded product was extruded from the twin-screw extruder and was pelletized with a strand cutter. Pellets (A'-3 to 5) were thus obtained. Thereafter, the pellets (A'-3 to 5) were dusted with Aerosil R972 so that the concentration of the powder relative to the mass of the pellets would be as described in Table 3. Pellets (A-3 to 5) were thus obtained. The transparency of the pellets obtained was good, rated as "a". Regarding antiblocking properties, the pellets obtained exhibited good antiblocking properties, rated as "AA", and were shown to have excellent handleability. The results are described in Table 3.

Examples 13 to 15

The acrylic triblock copolymer (I-1) obtained was dry blended beforehand with an acrylic random copolymer

TABLE 1

| | Block structure | Weight average molecular weight Mw | Molecular weight distribution Mw/Mn | Total content (mass %) of polymer blocks (A1) | Configuration (mass ratio) of polymer block (B1) |
|---|---|---|---|---|---|
| I-1 | PMMA-PMA/PnBA-PMMA | 147000 | 1.2 | 16.1 | MA/nBA = 50/50 |
| I-2 | PMMA-PMA/PnBA-PMMA | 150000 | 1.2 | 15.8 | MA/nBA = 75/25 |

TABLE 2

| | Block structure | Weight average molecular weight Mw | Molecular weight distribution Mw/Mn | Total content (mass %) of methyl methacrylate units | MFR 230° C., 3.8 kg (g/10 min) |
|---|---|---|---|---|---|
| II-1A-1 | PMMA-PnBA-PMMA | 62000 | 1.1 | 50.0 | 31 |
| II-1A-2 | PMMA-PnBA-PMMA | 66000 | 1.1 | 39.0 | 80 |
| III-1 | PMMA-PnBA-PMMA | 60000 | 1.1 | 30.5 | 330 |

Examples 1, 2 and 6 to 12

The acrylic triblock copolymer (I-1) or (1-2) obtained and the acrylic triblock copolymer (II-1A-1) or (II-1A-2) were (II-2A-1) having an MFR of 15 g/10 min as measured at a temperature of 230° C. under a load of 3.8 kg and a content of methyl methacrylate units of at least 80 mass % ("PARAPET (registered trademark) GF" manufactured by KURARAY CO., LTD.) in a ratio described in Table 3 to give a mixture. The mixture was melt-kneaded with a twin-screw extruder ("JSW-JBa II" manufactured by The Japan Steel Works, LTD.). The resultant melt-kneaded product was extruded from the twin-screw extruder and was pelletized with an underwater cutter. Pellets (A'-13 to 15) were thus obtained. Thereafter, the pellets (A'-13 to 15) were dusted with Aerosil R972 so that the concentration of the powder relative to the mass of the pellets would be as described in Table 3. Pellets (A-13 to 15) were thus obtained. The pellets obtained were slightly clouded, and the transparency thereof was rated as "b". Regarding antiblocking properties, the pellets obtained exhibited good antiblocking properties, rated as "A" or "AA", and were shown to have excellent handleability. The results are described in Table 3.

Example 16

Pellets (A-27) dusted with a concentration described in Table 3 of an antiblocking agent were obtained in the same manner as in Example 12, except that Aerosil R972 was replaced by the acrylic resin microparticles obtained in Production Example 6. The transparency of the pellets obtained was good, rated as "a". Regarding antiblocking properties, the pellets obtained exhibited good antiblocking properties, rated as "AA", and were shown to have excellent handleability. The results are described in Table 3.

Comparative Examples 1, 3 and 5 to 7

The acrylic triblock copolymer (I-1) or (1-2) obtained was melt-kneaded with a twin-screw extruder ("ZSK-25" manufactured by KRUPP WERNER & PFLEIDERER). The resultant melt-kneaded product was extruded from the twin-screw extruder and was pelletized with a strand cutter. Pellets (A'-16, 18 and 20 to 22) were thus obtained. Thereafter, the pellets were dusted with an antiblocking agent described in Table 3 so that the powder would have a predetermined concentration. Pellets (A-16, 18 and 20 to 22) were thus obtained. The pellets obtained were slightly clouded due to the amount of the antiblocking agent being large, and the transparency of the pellets was rated as "b". Regarding antiblocking properties, the pellets obtained exhibited blocking tendency, rated as "B", and were shown to have poor handleability. The results are described in Table 3.

Comparative Examples 2 and 4

The acrylic triblock copolymer (I-1) obtained was melt-kneaded with a twin-screw extruder ("JSW-JBa II" manufactured by The Japan Steel Works, LTD.). The resultant melt-kneaded product was extruded from the twin-screw extruder and was pelletized with an underwater cutter. Pellets (A'-17 and 19) were thus obtained. Thereafter, the pellets were dusted with an antiblocking agent described in Table 3 so that the powder would have a predetermined concentration. Pellets (A-17 and 19) were thus obtained. The pellets obtained were slightly clouded due to the amount of the antiblocking agent being large, and the transparency of the pellets was rated as "b". Regarding antiblocking properties, the pellets obtained exhibited blocking tendency, rated as "B", and were shown to have poor handleability. The results are described in Table 3.

Comparative Examples 8 to 10

The acrylic triblock copolymer (I-1) obtained was dry blended beforehand with an acrylic random copolymer (III-2) having an MFR of 8.0 g/10 min as measured at a temperature of 230° C. under a load of 3.8 kg and a content of methyl methacrylate units of at least 80 mass % ("PARAPET (registered trademark) G" manufactured by KURARAY CO., LTD.) in a ratio described in Table 3 to give a mixture. The mixture was melt-kneaded with a twin-screw extruder ("JSW-JBa II" manufactured by The Japan Steel Works, LTD.). The resultant melt-kneaded product was extruded from the twin-screw extruder and was pelletized with an underwater cutter. Pellets (A'-23 to 25) were thus obtained. Thereafter, the pellets (A'-23 to 25) were dusted with Aerosil R972 so that the concentration of the powder relative to the mass of the pellets would be as described in Table 3. Pellets (A-23 to 25) were thus obtained. The pellets obtained were slightly clouded, and the transparency thereof was rated as "b". Regarding antiblocking properties, the pellets obtained exhibited blocking tendency, rated as "B", and were shown to have poor handleability. The results are described in Table 3.

Comparative Example 11

The acrylic triblock copolymer (I-1) obtained and the acrylic triblock copolymer (III-1) were dry blended beforehand in a ratio described in Table 3 to give a mixture. The mixture was melt-kneaded with a twin-screw extruder ("JSW-JBa II" manufactured by The Japan Steel Works, LTD.). The resultant melt-kneaded product was extruded from the twin-screw extruder and was pelletized with an underwater cutter. Pellets (A'-26) were thus obtained. Thereafter, the pellets (A'-26) were dusted with Aerosil R972 so that the concentration of the powder relative to the mass of the pellets would be as described in Table 3. Pellets (A-26) were thus obtained. The pellets obtained were slightly clouded due to the amount of the antiblocking agent being large, and the transparency of the pellets was rated as "b". Regarding antiblocking properties, the pellets obtained exhibited blocking tendency, rated as "B", and were shown to have poor handleability. The results are described in Table 3.

TABLE 3

|  |  | Ex. 1 | Ex. 2 | Ex. 3 | Ex. 4 | Ex. 5 | Ex. 6 | Ex. 7 | Ex. 8 |
|---|---|---|---|---|---|---|---|---|---|
| Pellets A' |  | A'-1 | A'-2 | A'-3 | A'-4 | A'-5 | A'-6 | A'-7 | A'-8 |
| Acrylic triblock copolymer (I-1) | (Parts by mass) | 90 | 80 | 80 | 70 | 60 | 60 | 50 |  |
| Acrylic triblock copolymer (I-2) |  |  |  |  |  |  |  |  | 80 |

TABLE 3-continued

|  |  |  | Ex. 1 | Ex. 2 | Ex. 3 | Ex. 4 | Ex. 5 | Ex. 6 | Ex. 7 | Ex. 8 |
|---|---|---|---|---|---|---|---|---|---|---|
| Acrylic triblock copolymer (II-1A-1) |  |  | 10 | 20 | 20 | 30 | 40 | 40 | 50 | 20 |
| Acrylic triblock copolymer (II-1A-2) |  |  |  |  |  |  |  |  |  |  |
| Acrylic triblock copolymer (III-1) |  |  |  |  |  |  |  |  |  |  |
| Acrylic random copolymer (II-2A-1) |  |  |  |  |  |  |  |  |  |  |
| Acrylic random copolymer (III-2) |  |  |  |  |  |  |  |  |  |  |
| Pellets A |  |  | A-1 | A-2 | A-3 | A-4 | A-5 | A-6 | A-7 | A-8 |
| Antiblocking agents | ALFLOW H50T | Concentration relative to pellets A' |  |  |  |  |  |  |  |  |
|  | Aerosil R972 |  | 1000 ppm | 1000 ppm | 1500 ppm | 500 ppm | 500 ppm | 700 ppm | 500 ppm | 1000 ppm |
|  | Talc |  |  |  |  |  |  |  |  |  |
|  | Calcium carbonate |  |  |  |  |  |  |  |  |  |
|  | Acrylic resin microparticles |  |  |  |  |  |  |  |  |  |
| Antiblocking properties |  |  | A | AA | AA | AA | AA | AA | AA | AA |
| Transparency |  |  | a | a | a | a | a | a | a | a |

|  |  |  | Ex. 9 | Ex. 10 | Ex. 11 | Ex. 12 | Ex. 13 | Ex. 14 | Ex. 15 | Ex. 16 |
|---|---|---|---|---|---|---|---|---|---|---|
| Pellets A' |  |  | A'-9 | A'-10 | A'-11 | A'-12 | A'-13 | A'-14 | A'-15 | A'-12 |
| Acrylic triblock copolymer (I-1) | (Parts by mass) |  |  | 80 | 70 | 60 | 90 | 70 | 60 | 60 |
| Acrylic triblock copolymer (I-2) |  |  | 60 |  |  |  |  |  |  |  |
| Acrylic triblock copolymer (II-1A-1) |  |  | 40 |  |  |  |  |  |  |  |
| Acrylic triblock copolymer (II-1A-2) |  |  |  | 20 | 30 | 40 |  |  |  | 40 |
| Acrylic triblock copolymer (III-1) |  |  |  |  |  |  |  |  |  |  |
| Acrylic random copolymer (II-2A-1) |  |  |  |  |  |  | 10 | 30 | 40 |  |
| Acrylic random copolymer (III-2) |  |  |  |  |  |  |  |  |  |  |
| Pellets A |  |  | A-9 | A-10 | A-11 | A-12 | A-13 | A-14 | A-15 | A-27 |
| Antiblocking agents | ALFLOW H50T | Concentration relative to pellets A' |  |  |  |  |  |  |  |  |
|  | Aerosil R972 |  | 500 ppm | 1000 ppm | 1000 ppm | 1000 ppm | 500 ppm | 500 ppm | 500 ppm |  |
|  | Talc |  |  |  |  |  |  |  |  |  |
|  | Calcium carbonate |  |  |  |  |  |  |  |  |  |
|  | Acrylic resin microparticles |  |  |  |  |  |  |  |  | 1000 ppm |
| Antiblocking properties |  |  | AA | A | AA | AA | A | AA | AA | AA |
| Transparency |  |  | a | a | a | a | b | b | b | a |

|  |  |  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 | Comp. Ex. 11 |
|---|---|---|---|---|---|---|---|---|---|---|---|---|---|
| Pellets A' |  |  | A'-16 | A'-17 | A'-18 | A'-19 | A'-20 | A'-21 | A'-22 | A'-23 | A'-24 | A'-25 | A'-26 |
| Acrylic triblock copolymer (I-1) | (Parts by mass) |  | 100 | 100 | 100 | 100 | 100 | 100 |  | 90 | 70 | 60 | 60 |
| Acrylic triblock copolymer (I-2) |  |  |  |  |  |  |  |  | 100 |  |  |  |  |
| Acrylic triblock copolymer (II-1A-1) |  |  |  |  |  |  |  |  |  |  |  |  |  |
| Acrylic triblock copolymer (II-1A-2) |  |  |  |  |  |  |  |  |  |  |  |  |  |
| Acrylic triblock copolymer (III-1) |  |  |  |  |  |  |  |  |  |  |  |  | 40 |
| Acrylic random copolymer (II-2A-1) |  |  |  |  |  |  |  |  |  |  |  |  |  |
| Acrylic random copolymer (III-2) |  |  |  |  |  |  |  |  |  |  | 10 | 30 | 40 |

TABLE 3-continued

| Pellets A | | | A-16 | A-17 | A-18 | A-19 | A-20 | A-21 | A-22 | A-23 | A-24 | A-25 | A-26 |
|---|---|---|---|---|---|---|---|---|---|---|---|---|---|
| Antiblocking agents | ALFLOW H50T | Concentration relative to pellets A' | 3000 ppm | 2500 ppm | | | | | 3000 ppm | | | | |
| | Aerosil R972 | | | | 3000 ppm | 2500 ppm | | | | 3000 ppm | 3000 ppm | 3000 ppm | 3000 ppm |
| | Talc | | | | | | 3000 ppm | | | | | | |
| | Calcium carbonate | | | | | | | 3000 ppm | | | | | |
| Antiblocking properties | | | B | B | B | B | B | B | B | B | B | B | B |
| Transparency | | | b | b | b | b | b | b | b | b | b | b | b |

Example 17

The pellets (A-9) obtained in Example 9 were charged into a single-screw extruder through a hopper, thermally melted under a temperature condition of 180° C., and extruded from a T-die located at the tip of the single-screw extruder to laminate a 300 mm wide and 100 μm thick polymer layer formed from the pellets (A-9) onto a PET film (thickness: 250 μm, "E5001" manufactured by TOYOBO CO., LTD.) (T-die method). Further, a silicon release-treated PET (thickness: 50 μm, "A31" manufactured by Teijin Solutions) was applied so that the release-treated surface would cover in contact with the surface of the polymer layer. A laminate film was thus fabricated. The take-off speed was 2.0 m/min. The pellets (A-9) that were used were excellent in antiblocking properties and were successfully supplied to the single-screw extruder at a stable speed without sticking to one another. As a result, the laminate film obtained attained high accuracy with as small a variation in thickness as ±5 μm. The film obtained was a very flexible film having high transparency and excellent antiblocking properties.

Example 18

A laminate film was fabricated in the same manner as in Example 17, except that the thickness of the polymer layer formed from the pellets (A-9) was changed to 200 m. The film obtained attained high accuracy with as small a variation in film thickness as ±5 km.

Example 19

A polycarbonate ("Iupilon S2000" manufactured by Mitsubishi Engineering-Plastics Corporation) was charged into an injection molding machine ("UH1000-80" manufactured by NISSEI PLASTIC INDUSTRIAL CO., LTD.) which had been preset to a cylinder temperature of 290° C. and a mold temperature of 90° C., and was shaped into an article 100 mm in length, 40 mm in width and 1 mm in thickness which would be used as a polymer layer (Y) for insert molding. Next, the shaped article as a layer (Y) was set into an injection mold 100 mm in length, 40 mm in width and 2 mm in thickness so that the shaped article was in contact with the bottom surface of the mold. The injection molding machine was then set to a cylinder temperature of 180° C. and a mold temperature of 50° C., and the pellets (A-9) were injected into the space in the mold. A multilayer article having a layer (Z) and a layer (Y) was thus fabricated (insert molding). The multilayer article obtained was transparent and had good adhesion between the two layers.

Example 20

A multilayer article was fabricated by insert molding in the same manner as in Example 19, except that the pellets (A-9) were replaced by the pellets (A-12). The multilayer article obtained was transparent and had good adhesion between the two layers.

Examples 21 to 26

The pellets (A-9) obtained in Example 9, oxidation inhibitors, a light stabilizer and UV absorbers were dry blended beforehand in a ratio described in Table 4 to give a mixture. The mixture was melt-kneaded with a twin-screw extruder ("ZSK-25" manufactured by KRUPP WERNER & PFLEIDERER) that had been preset to a cylinder temperature of 180° C. The resultant melt-kneaded product was extruded from the twin-screw extruder and was pelletized with a strand cutter. Further, 300 ppm of Aerosil R972 as an antiblocking agent was added. Thus, pellets as a shaping feedstock were obtained. Thereafter, the pellets obtained were molded on an injection molding machine ("SE18DU" manufactured by Sumitomo Heavy Industries, Ltd.) that had been preset to a cylinder temperature of 180° C. and a mold temperature of 50° ° C. to form a sheet-shaped article 5 cm in length, 5 cm in width and 3 mm in thickness. With a direct reading haze meter (manufactured by NIPPON DENSHOKU INDUSTRIES CO., LTD.), the haze of the shaped article was measured in accordance with ISO 14782 and the total luminous transmittance of the shaped article was measured in accordance with ISO 13468-1. Further, color characteristics (b*) in the L*a*b* color system were measured using SD5000 manufactured by NIPPON DENSHOKU INDUSTRIES CO., LTD. (measurement conditions: light source D65, field of view 2°). The appearance of the shaped article was evaluated as "clear" when visual inspection on the entire article found no unevenness, and was evaluated as "unclear" when any unevenness was present.

Thereafter, the sheet-shaped article was subjected to an accelerated weather resistance test using a QUV accelerated weathering tester (manufactured by Q-LAB; light source: UV-340, 0.60 W/m²). (Test conditions: One cycle consisted of a total of 12 hours of UV irradiation (60° C., 8 hours) and water spraying (50° C., 4 hours). Fourteen cycles (168 hours in total) were performed.) The haze, total luminous transmittance, color characteristics (b*) and appearance of the sheet-shaped article after the accelerated weather resistance test were evaluated under the measurement conditions described hereinabove. The results are described in Table 4. In Table 4, the two values in each of the cells in the columns of haze, total luminous transmittance and color characteristics (b*) indicate the result before the accelerated weather resistance test on the left, and the result after the accelerated weather resistance test on the right.

As described in Table 4, the change in color characteristics before and after the accelerated test was smaller particularly when the additives such as oxidation inhibitors, light stabilizer and UV absorbers were added in Examples 22 to 25.

The additives (oxidation inhibitors, light stabilizer and UV absorbers) used in Examples above are described below.

Additives
Phenolic Oxidation Inhibitor
  ADK STAB AO-60: Manufactured by ADEKA CORPORATION. Pentaerythritol tetrakis[3-(3,5-di-t-butyl-4-hydroxyphenoxy)propionate]
Phosphorus Oxidation Inhibitor
  ADK STAB PEP-36: Manufactured by ADEKA CORPORATION. 3,9-Bis(2,6-di-t-butyl-4-methylphenoxy)-2,4,8,10-tetraoxa-3,9-diphosphaspiro[5.5]undecane
Light Stabilizer
  TINUVIN 144: Manufactured by BASF.
Bis(1,2,2,6,6-pentamethyl-4-piperidinyl)-[[3,5-bis(1,1-dimethylethyl)-4-hydroxyphenyl]methyl]butyl malonate
UV absorbers
  Viosorb 583: Manufactured by KYODO CHEMICAL CO., LTD. 2-Phenol, 2-(2H-benzotriazol-2-yl)-4-(1,1,3,3-tetramethylbutyl)
  ADK STAB LA-31RG: Manufactured by ADEKA CORPORATION. 2,2'-Methylenebis[6-(2H-benzotriazol-2-yl)-4-(1,1,3,3-tetramethylbutyl)phenol]
  ADK STAB LA-46: Manufactured by ADEKA CORPORATION. (2-(4,6-Diphenyl-1,3,5-triazin-2-yl)-5-[2-(2-ethylhexanoloxy)ethoxy]phenol week after the fabrication of the shaped article, the appearance of the shaped article was visually inspected for the presence or absence of components bleeding on the surface. The lubricity of the surface was sensorily evaluated by touching the surface of the shaped article with a finger. The results are described in Table 5.

Example 28 which involved the addition as a lubricant of an unreactive silicone oil having polyether-modified side chains (silicone oil KF351A) resulted in a transparent article which suffered no bleed out of the lubricant and had higher surface lubricity than Example 27 involving no lubricants added.

The additives (lubricants) used in Examples above are described below.

Additives
Lubricants (Unreactive Silicone Oils)
  KF351A: Side-chain polyether modified silicone oil manufactured by Shin-Etsu Chemical Co., Ltd.
  KF6002: Di-terminal-hydroxylated silicone oil manufactured by Shin-Etsu Chemical Co., Ltd.

TABLE 5

|  |  |  | Ex. 27 | Ex. 28 | Ex. 29 |
| --- | --- | --- | --- | --- | --- |
| Pellets | (A-9) | (Parts | 100 | 100 | 100 |
| Lubricants | KF351A | by |  | 0.2 |  |
| (unreactive | KF6002 | mass) |  |  | 0.2 |
| silicone oils) |  |  |  |  |  |

TABLE 4

|  |  |  | Ex. 21 | Ex. 22 | Ex. 23 | Ex. 24 | Ex. 25 | Ex. 26 |
| --- | --- | --- | --- | --- | --- | --- | --- | --- |
| Pellets | A-9 | (Parts | 100 | 100 | 100 | 100 | 100 | 100 |
| Oxidation | ADK STAB AO-60 | by |  | 0.1 | 0.1 | 0.1 | 0.1 |  |
| inhibitors | ADK STAB PEP-36 | mass) |  | 0.1 | 0.1 | 0.1 | 0.1 |  |
| Light stabilizer | TINUVIN 144 |  |  | 0.2 | 0.2 | 0.2 | 0.2 |  |
| UV absorbers | Viosorb 583 |  |  |  | 0.2 |  |  |  |
|  | ADK STAB LA-31RG |  |  |  |  | 0.2 |  |  |
|  | ADK STAB LA-46 |  |  |  |  | 0.2 | 0.5 | 0.5 |
| Haze*[1] |  |  | 12.5/13.2 | 13.2/14.0 | 13.7/14.5 | 12.8/13.7 | 13.5/14.5 | 12.8/13.8 |
| Total luminous transmittance*[1] |  |  | 89.1/89.0 | 88.7/88.7 | 88.6/88.5 | 88.8/88.9 | 88.6/88.9 | 88.7/89.0 |
| b**[1] |  |  | 1.1/3.1 | 1.3/1.3 | 1.5/1.3 | 1.6/1.6 | 2.0/2.1 | 2.2/2.3 |
| Appearance |  |  | Clear | Clear | Clear | Clear | Clear | Clear |

*[1]In the columns, the results before the accelerated weather resistance test are indicated left, and the results after the accelerated weather resistance test are shown right.

Examples 27 to 29

The pellets (A-9) obtained in Example 9 and optionally an unreactive silicone oil were charged in a ratio described in Table 5 into Labo Plastomill and were melt-kneaded at a temperature of 180° C. and a rotational speed of 50 rpm for 5 minutes. The resultant melt-kneaded product was taken out. The melt-kneaded product was formed into a sheet-shaped article 3 cm in length, 6 mm in width and 3 mm in thickness with use of Minimax preset at a temperature of 200° C. With a direct reading haze meter (manufactured by NIPPON DENSHOKU INDUSTRIES CO., LTD.), the haze of the shaped article was measured in accordance with ISO 14782 and the total luminous transmittance of the shaped article was measured in accordance with ISO 13468-1. One TABLE 5-continued

|  | Ex. 27 | Ex. 28 | Ex. 29 |
| --- | --- | --- | --- |
| Haze | 9.4 | 10.8 | 18.2 |
| Total luminous transmittance | 91.7 | 92.4 | 80.7 |
| Appearance (after 1 week) | No bleeding | No bleeding | No bleeding |
| Surface lubricity | Slightly biting | Smooth | Smooth |

Examples 30 and 31

The pellets (A-9) obtained in Example 9 and titanium oxide were charged in a ratio described in Table 6 into Labo Plastomill and were melt-kneaded at a temperature of 230° C. and a rotational speed of 50 rpm for 5 minutes to give a shaping feedstock in which the titanium oxide was uniformly dispersed. The shaping feedstock obtained was press-molded at a temperature of 200° C. and a press pressure of 50 kgf/cm² to form a sheet having a thickness of 300 μm. With a direct reading haze meter (manufactured by NIPPON DENSHOKU INDUSTRIES CO., LTD.), the total luminous transmittance of the sheet was measured in accordance with ISO 13468-1. The light shielding ratio was calculated from (light shielding ratio)=1−(total luminous transmittance). The results are described in Table 6.

These Examples resulted in a high light shielding ratio of above 98.5% in spite of the sheet being as thin as 300 μm.

The additive (filler) used in Examples above is described below.

Additive
Filler
Titanium oxide: CR90 manufactured by ISHIHARA SANGYO KAISHA, LTD.

TABLE 6

|  |  |  | Ex. 30 | Ex. 31 |
|---|---|---|---|---|
| Pellets | A-9 | (Parts | 70 | 50 |
| Titanium oxide | Titanium oxide | by mass) | 30 | 50 |
| Light shielding ratio (%) |  |  | 98.6 | 99.6 |

Examples 32 to 36

The pellets (A-12) obtained in Example 12 and a polymer were kneaded together in Labo Plastomill in accordance with the combination of polymers, the mixing ratio and the kneading temperature described in Table 7 below. The resultant mixture was press-molded at a temperature described in Table 7 while using a 1 mm thick spacer. The pressed sheet obtained was visually inspected to evaluate the compatibility. Examples 33 to 35 resulted in high compatibility, rated as "1". The sheets from Examples 32 and 36, although being slightly clouded, were fairly high in compatibility and rated as "2". Thus, the pellets showed fairly high compatibility with the additional polymers used in Examples 32 to 36. The results are described in Table 7.

Additional Polymers
Polycarbonate: Iupilon S-3000 manufactured by Mitsubishi Engineering-Plastics Corporation.
Acrylic resin: PARAPET (registered trademark) GF manufactured by KURARAY CO., LTD.
Styrenic thermoplastic elastomer: SEPTON (registered trademark) 2004 manufactured by KURARAY CO., LTD.
Styrenic thermoplastic elastomer: HYBRAR (registered trademark) 7311 manufactured by KURARAY CO., LTD.
PET-G: Eastar GN007 manufactured by Eastman.

From the foregoing, it has been shown that the pellets of the present invention including an acrylic triblock copolymer (I) and an acrylic polymer (II) are excellent in antiblocking performance and in pellet handleability.

TABLE 7

|  |  |  |  | Ex. 32 | Ex. 33 | Ex. 34 | Ex. 35 | Ex. 36 |
|---|---|---|---|---|---|---|---|---|
| Pellets |  | A-12 | (Parts | 10 | 10 | 10 | 10 | 10 |
| Additional polymers | Polycarbonate | Iupilon S-3000 | by mass) | 90 |  |  |  |  |
|  | Acrylic resin | PARAPET (registered trademark) GF |  |  | 90 |  |  |  |
|  | Styrenic thermoplastic elastomers | SEPTON (registered trademark) 2004 |  |  |  | 90 |  |  |
|  |  | HYBRAR (registered trademark) 7311 |  |  |  |  | 90 |  |
|  | PET-G | Eastar GN007 |  |  |  |  |  | 90 |
| Kneading temperature and press temperature (° C.) |  |  |  | 270 | 230 | 210 | 210 | 230 |
| Compatibility in pressed sheet |  |  |  | 2 | 1 | 1 | 1 | 2 |

The invention claimed is:

1. Pellets, comprising:
an acrylic block copolymer (I) comprising a polymer block (A1) comprising methacrylic acid ester units and a polymer block (B1) comprising acrylic acid ester units, and
an acrylic polymer (II) comprising 35 mass % or more methyl methacrylate units and having a melt flow rate (MFR) measured at 230° C. under 3.8 kg load of not less than 10 g/10 min,
wherein
the acrylic acid ester units present in the polymer block (B1) of the acrylic block copolymer (I) consist of methyl acrylate units and acrylic acid ester units of formula $CH_2=CH-COOR^1$ (1), wherein $R_1$ represents a C4-C12 alkyl group,
and
a mass ratio (I)/(II) of the acrylic block copolymer (I) to the acrylic polymer (II) is from 90/10 to 40/60.

2. The pellets of claim 1, further comprising 200 to 2000 ppm of an antiblocking agent.

3. A shaped article obtained by shaping the pellets of claim 1.

4. The pellets of claim 1 wherein a mass ratio of the methyl acrylate units to the acrylic acid ester (1) units in the polymer block (B1), is from 90/10 to 10/90.

* * * * *